United States Patent
Zheng et al.

(10) Patent No.: US 10,212,717 B2
(45) Date of Patent: Feb. 19, 2019

(54) DATA TRANSMISSION METHOD AND COMMUNICATIONS DEVICE

(71) Applicant: HUAWEI TECHNOLOGIES CO., LTD., Shenzhen, Guangdong (CN)

(72) Inventors: Juan Zheng, Beijing (CN); Qiang Li, Shenzhen (CN); Sha Ma, Beijing (CN); Zhiyu Yan, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 63 days.

(21) Appl. No.: 15/416,524

(22) Filed: Jan. 26, 2017

(65) Prior Publication Data
US 2017/0142737 A1    May 18, 2017

Related U.S. Application Data

(63) Continuation of application No. PCT/CN2014/083491, filed on Jul. 31, 2014.

(51) Int. Cl.
*H04L 1/00*    (2006.01)
*H04W 72/08*    (2009.01)
*H04W 16/14*    (2009.01)
*H04W 72/04*    (2009.01)

(52) U.S. Cl.
CPC ......... *H04W 72/085* (2013.01); *H04W 16/14* (2013.01); *H04W 72/0413* (2013.01); *H04W 72/0446* (2013.01); *H04W 72/0453* (2013.01)

(58) Field of Classification Search
None
See application file for complete search history.

(56) References Cited

U.S. PATENT DOCUMENTS

| | | |
|---|---|---|
| 6,349,210 B1 | 2/2002 | Li |
| 6,404,756 B1 | 6/2002 | Whitehill et al. |
| 2003/0058886 A1 | 3/2003 | Stanforth et al. |

(Continued)

FOREIGN PATENT DOCUMENTS

| | | |
|---|---|---|
| CN | 101686478 A | 3/2010 |
| CN | 101990211 A | 3/2011 |

(Continued)

OTHER PUBLICATIONS

International Search Report dated May 8, 2015 in corresponding International Patent Application No. PCT/CN2014/083491.

(Continued)

*Primary Examiner* — Phirin Sam
(74) *Attorney, Agent, or Firm* — Staas & Halsey LLP

(57) ABSTRACT

A data transmission method and a communications device resolve an existing problem that use of an unlicensed spectrum is interfered with between LTE devices when a padding is sent. The method includes: performing, by a communications device, CCA on an unlicensed spectrum; and when determining that the unlicensed spectrum is in an idle state, sending, by the communications device on a preset band resource in the unlicensed spectrum, a signal indicating that the communications device uses the unlicensed spectrum, where the preset band resource is a partial band resource in the unlicensed spectrum. Mutual interference between communications devices when the unlicensed spectrum is used is eliminated.

14 Claims, 5 Drawing Sheets

S41
A communications device performs CCA on an unlicensed spectrum

S42
When determining that the unlicensed spectrum is in an idle state, the communications device sends, on a preset band resource in the unlicensed spectrum, a signal indicating that the communications device uses the unlicensed spectrum, where the preset band resource is a partial band resource in the unlicensed spectrum

(56) References Cited

U.S. PATENT DOCUMENTS

| | | |
|---|---|---|
| 2010/0232365 A1 | 9/2010 | Lu et al. |
| 2011/0249659 A1 | 10/2011 | Fontaine et al. |
| 2012/0243485 A1 | 9/2012 | Merlin et al. |
| 2012/0257585 A1* | 10/2012 | Sydor ............ H04W 72/082 370/329 |
| 2013/0012134 A1 | 1/2013 | Jin et al. |
| 2013/0012164 A1 | 1/2013 | Jin et al. |
| 2013/0155953 A1 | 6/2013 | Chu et al. |
| 2013/0156019 A1 | 6/2013 | Chen |
| 2013/0163447 A1* | 6/2013 | Koskela ............ H04L 5/001 370/252 |
| 2013/0315219 A1 | 11/2013 | Cheong et al. |
| 2014/0079016 A1 | 3/2014 | Dai et al. |
| 2017/0164230 A1* | 6/2017 | You ................ H04W 28/04 |

FOREIGN PATENT DOCUMENTS

| | | |
|---|---|---|
| CN | 102202028 A | 9/2011 |
| CN | 102843696 A | 12/2012 |
| CN | 103119982 A | 5/2013 |
| CN | 103188711 A | 7/2013 |
| CN | 103416017 A | 11/2013 |
| EP | 2 217 030 B1 | 8/2011 |
| EP | 2757850 A1 | 7/2014 |
| JP | 2003-513591 | 4/2003 |
| JP | 2005-505166 | 2/2005 |
| JP | 2010-193446 | 9/2010 |
| JP | 2012-513715 | 6/2012 |
| JP | 2014-502453 | 1/2014 |
| WO | 2012/040495 A1 | 3/2012 |

OTHER PUBLICATIONS

International Search Report dated May 8, 2015 in corresponding International Application No. PCT/CN2014/083491.
Mohapatra, P. Krishnamurthy, S.: "Ad Hoc Networks—Technologies and Protocols," Sep. 23, 2004, Springer, XP002771065.
Extended European Search Report dated Jun. 26, 2017 in corresponding European Patent Application No. 14898733.2.
Japanese Office Action dated May 8, 2018, in corresponding Japanese patent Application No. 2017-505149, 10 pgs.
Office Action, dated Aug. 28, 2018, in Chinese Application No. 201480037741.5 (9 pp.).

* cited by examiner

DATA TRANSMISSION METHOD AND COMMUNICATIONS DEVICE

CROSS-REFERENCE TO RELATED APPLICATIONS

This application is a continuation of International Application No. PCT/CN2014/083491, filed on Jul. 31, 2014, the disclosure of which is hereby incorporated by reference in its entirety.

TECHNICAL FIELD

The present disclosure relates to the field of wireless communications technologies, and in particular, to a data transmission method and a communications device.

BACKGROUND

Because no constraint is set for a wireless communications system and an operator to use an unlicensed spectrum, a case in which multiple operators of multiple types of communications systems occupy a same spectrum may occur. To avoid occurrence of the foregoing case, a rule for a wireless communications device to use an unlicensed spectrum needs to be formulated. For example, the European Telecommunications Standards Institute (ETSI) has released the ETSI EN 301 893, which stipulates a Listen Before Talk (LBT) rule for using an unlicensed spectrum. According to stipulations in the ETSI EN 301 893, the wireless communications device needs to use the LBT rule when using the unlicensed spectrum for communication, that is, the wireless communications device first monitors whether a channel on the unlicensed spectrum is idle, and if the channel is idle, the channel may be used. However, time of occupying the channel is limited. The wireless communications device may perform clear channel assessment (CCA) by means of energy detection and/or signal parsing, so as to determine whether the monitored channel is idle.

In a Long Term Evolution (LTE) system, if an LTE device (that is, a communications device in the LTE system) can be applied to an unlicensed spectrum, not only an unlicensed spectrum resource may be effectively used, but also more effective wireless access may be provided, and an increasing demand of mobile broadband services may be met. However, currently, a minimum time unit of data scheduling and data transmission of the LTE device is one subframe, and therefore, even if the LTE device detects that the unlicensed spectrum is idle or the channel on the unlicensed spectrum is idle, data can be transmitted on the unlicensed spectrum only after a subframe boundary moment arrives. Before arrival of the subframe boundary moment for which the LTE device waits, the LTE device cannot perform data transmission on the unlicensed spectrum, and therefore, the unlicensed spectrum is actually still in an idle state. In this case, another device (for example, a WiFi device) may occupy the unlicensed spectrum during the waiting time of the LTE device.

To prevent another device from occupying, during the waiting time of the LTE device, an available unlicensed spectrum detected by the LTE device, after determining that the monitored channel on the unlicensed spectrum is available, and before starting to send data, the LTE device may send a preemption signal (Padding in English) on the unlicensed spectrum. By using this method, another device may be prevented from occupying, during the waiting time of the LTE device, the idle unlicensed spectrum detected by the LTE device. However, if the padding is not properly designed, use of the unlicensed spectrum may be interfered with between LTE devices, and consequently the LTE device cannot use the unlicensed spectrum effectively, and utilization of the unlicensed spectrum is reduced.

SUMMARY

Embodiments of the present invention provide a data transmission method and a communications device, so as to resolve an existing problem that use of an unlicensed spectrum is interfered with between LTE devices when a padding is sent.

According to a first aspect, a communications device is provided, where the communications device includes:

a clear channel assessment CCA module, configured to perform clear channel assessment CCA on an unlicensed spectrum; and a sending module, configured to: when the CCA module determines that the unlicensed spectrum is in an idle state, send, on a preset band resource in the unlicensed spectrum, a signal indicating that the communications device uses the unlicensed spectrum, where the preset band resource is a partial band resource in the unlicensed spectrum.

With reference to the first aspect, in a first possible implementation manner, the preset band resource is:

a band resource in the unlicensed spectrum, where the band resource and a band resource that can be used by the communications device have a same frequency-domain location but different time-domain locations; or a band resource that is in the unlicensed spectrum and that is specified to be used only to send the signal indicating that the communications device uses the unlicensed spectrum.

With reference to the first aspect, or the first possible implementation manner of the first aspect, in a second possible implementation manner, the CCA module is specifically configured to:

perform the CCA on the preset band resource in the unlicensed spectrum.

With reference to the first aspect, the first possible implementation manner of the first aspect, or the second possible implementation manner of the first aspect, in a third possible implementation manner, the sending module is further configured to:

send, on another band resource in the unlicensed spectrum except the preset band resource, a signal indicating the band resource that can be used by the communications device in the unlicensed spectrum.

With reference to the third possible implementation manner of the first aspect, in a fourth possible implementation manner, the signal indicating the band resource that can be used by the communications device in the unlicensed spectrum includes identification information of the band resource that can be used by the communications device in the unlicensed spectrum; or the signal indicating the band resource that can be used by the communications device in the unlicensed spectrum is a signal on which modulation and/or encoding processing is performed by using identification information of the band resource that can be used by the communications device in the unlicensed spectrum as a scrambling code.

With reference to the first aspect, the first possible implementation manner of the first aspect, the second possible implementation manner of the first aspect, the third possible implementation manner of the first aspect, or the fourth possible implementation manner of the first aspect, in a fifth possible implementation manner, determining, by the CCA module, whether the unlicensed spectrum is in an idle state includes:

when performing the CCA, if a signal that is sent by another communications device and that indicates that the another communications device uses the unlicensed spectrum is detected on the preset band resource in the unlicensed spectrum, determining that the unlicensed spectrum is in a non-idle state; or when performing the CCA, if a signal that is sent by another communications device and that indicates that the another communications device uses the unlicensed spectrum is not detected on the preset band resource in the unlicensed spectrum, determining that the unlicensed spectrum is in an idle state.

With reference to the first aspect, the first possible implementation manner of the first aspect, the second possible implementation manner of the first aspect, the third possible implementation manner of the first aspect, the fourth possible implementation manner of the first aspect, or the fifth possible implementation manner of the first aspect, in a sixth possible implementation manner, the determining, by the CCA module, whether the unlicensed spectrum is in an idle state includes:

when performing the CCA, if a signal that is sent by the another communications device and that indicates a band resource that can be used by the another communications device in the unlicensed spectrum is detected on the preset band resource in the unlicensed spectrum, determining whether the unlicensed spectrum is in an idle state according to whether the band resource that can be used by the another communications device and the band resource that can be used by the communications device are a same band resource.

With reference to the sixth possible implementation manner of the first aspect, in a seventh possible implementation manner, the determining, by the CCA module, whether the unlicensed spectrum is in an idle state according to whether the band resource that can be used by the another communications device and the band resource that can be used by the communications device are a same band resource includes:

if the band resource that can be used by the another communications device and the band resource that can be used by the communications device are the same band resource, determining that the unlicensed spectrum is in a non-idle state; or if the band resource that can be used by the another communications device and the band resource that can be used by the communications device are not the same band resource, determining that the unlicensed spectrum is in an idle state.

According to a second aspect, a communications device is provided, where the communications device includes:

a processor, configured to perform clear channel assessment CCA on an unlicensed spectrum; and a transceiver, configured to: when the processor determines that the unlicensed spectrum is in an idle state, send, on a preset band resource in the unlicensed spectrum, a signal indicating that the communications device uses the unlicensed spectrum, where the preset band resource is a partial band resource in the unlicensed spectrum.

With reference to the second aspect, in a first possible implementation manner, the preset band resource is:

a band resource in the unlicensed spectrum, where the band resource and a band resource that can be used by the communications device have a same frequency-domain location but different time-domain locations; or a band resource that is in the unlicensed spectrum and that is specified to be used only to send the signal indicating that the communications device uses the unlicensed spectrum.

With reference to the second aspect, or the first possible implementation manner of the second aspect, in a second possible implementation manner, the processor is specifically configured to:

perform the CCA on the preset band resource in the unlicensed spectrum.

With reference to the second aspect, the first possible implementation manner of the second aspect, or the second possible implementation manner of the second aspect, in a third possible implementation manner, the transceiver is further configured to:

send, on another band resource in the unlicensed spectrum except the preset band resource, a signal indicating the band resource that can be used by the communications device in the unlicensed spectrum.

With reference to the third possible implementation manner of the second aspect, in a fourth possible implementation manner, the signal indicating the band resource that can be used by the communications device in the unlicensed spectrum includes identification information of the band resource that can be used by the communications device in the unlicensed spectrum; or the signal indicating the band resource that can be used by the communications device in the unlicensed spectrum is a signal on which modulation and/or encoding processing is performed by using identification information of the band resource that can be used by the communications device in the unlicensed spectrum as a scrambling code.

With reference to the second aspect, the first possible implementation manner of the second aspect, the second possible implementation manner of the second aspect, the third possible implementation manner of the second aspect, or the fourth possible implementation manner of the second aspect, in a fifth possible implementation manner, determining, by the processor, whether the unlicensed spectrum is in an idle state includes:

when performing the CCA, if the transceiver detects, on the preset band resource in the unlicensed spectrum, a signal that is sent by another communications device and that indicates that the another communications device uses the unlicensed spectrum, determining that the unlicensed spectrum is in a non-idle state; or when performing the CCA, if the transceiver does not detect, on the preset band resource in the unlicensed spectrum, a signal that is sent by another communications device and that indicates that the another communications device uses the unlicensed spectrum, determining that the unlicensed spectrum is in an idle state.

With reference to the second aspect, the first possible implementation manner of the second aspect, the second possible implementation manner of the second aspect, the third possible implementation manner of the second aspect, the fourth possible implementation manner of the second aspect, or the fifth possible implementation manner of the second aspect, in a sixth possible implementation manner, the determining, by the processor, whether the unlicensed spectrum is in an idle state includes:

when performing the CCA, if the transceiver detects, on the preset band resource in the unlicensed spectrum, a signal that is sent by the another communications device and that indicates a band resource that can be used by the another communications device in the unlicensed spectrum, determining whether the unlicensed spectrum is in an idle state according to whether the band resource that can be used by the another communications device and the band resource that can be used by the communications device are a same band resource.

With reference to the sixth possible implementation manner of the second aspect, in a seventh possible implementation manner, the determining, by the processor, whether the unlicensed spectrum is in an idle state according to whether the band resource that can be used by the another communications device and the band resource that can be used by the communications device are a same band resource includes:

if the band resource that can be used by the another communications device and the band resource that can be used by the communications device are the same band resource, determining that the unlicensed spectrum is in a non-idle state; or if the band resource that can be used by the another communications device and the band resource that can be used by the communications device are not the same band resource, determining that the unlicensed spectrum is in an idle state.

According to a third aspect, a data transmission method is provided, where the method includes:

performing, by a communications device, clear channel assessment CCA on an unlicensed spectrum; and when determining that the unlicensed spectrum is in an idle state, sending, by the communications device on a preset band resource in the unlicensed spectrum, a signal indicating that the communications device uses the unlicensed spectrum, where the preset band resource is a partial band resource in the unlicensed spectrum.

With reference to the third aspect, in a first possible implementation manner, the preset band resource is:

a band resource in the unlicensed spectrum, where the band resource and a band resource that can be used by the communications device have a same frequency-domain location but different time-domain locations; or a band resource that is in the unlicensed spectrum and that is specified to be used only to send the signal indicating that the communications device uses the unlicensed spectrum.

With reference to the third aspect, or the first possible implementation manner of the third aspect, in a second possible implementation manner, the performing, by the communications device, the CCA on an unlicensed spectrum includes:

performing, by the communications device, the CCA on the preset band resource in the unlicensed spectrum.

With reference to the third aspect, the first possible implementation manner of the third aspect, or the second possible implementation manner of the third aspect, in a third possible implementation manner, after determining, by the communications device, that the unlicensed spectrum is in an idle state, the method further includes:

sending, by the communications device on another band resource in the unlicensed spectrum except the preset band resource, a signal indicating the band resource that can be used by the communications device in the unlicensed spectrum.

With reference to the third possible implementation manner of the third aspect, in a fourth possible implementation manner, the signal indicating the band resource that can be used by the communications device in the unlicensed spectrum includes identification information of the band resource that can be used by the communications device in the unlicensed spectrum; or the signal indicating the band resource that can be used by the communications device in the unlicensed spectrum is a signal on which modulation and/or encoding processing is performed by using identification information of the band resource that can be used by the communications device in the unlicensed spectrum as a scrambling code.

With reference to the third aspect, the first possible implementation manner of the third aspect, the second possible implementation manner of the third aspect, the third possible implementation manner of the third aspect, or the fourth possible implementation manner of the third aspect, in a fifth possible implementation manner, determining, by the communications device, whether the unlicensed spectrum is in an idle state includes:

when performing the CCA, if the communications device detects, on the preset band resource in the unlicensed spectrum, a signal that is sent by another communications device and that indicates that the another communications device uses the unlicensed spectrum, determining, by the communications device, that the unlicensed spectrum is in a non-idle state; or when performing the CCA, if the communications device does not detect, on the preset band resource in the unlicensed spectrum, a signal that is sent by another communications device and that indicates that the another communications device uses the unlicensed spectrum, determining, by the communications device, that the unlicensed spectrum is in an idle state.

With reference to the third aspect, the first possible implementation manner of the third aspect, the second possible implementation manner of the third aspect, the third possible implementation manner of the third aspect, the fourth possible implementation manner of the third aspect, or the fifth possible implementation manner of the third aspect, in a sixth possible implementation manner, the determining, by the communications device, whether the unlicensed spectrum is in an idle state includes:

when performing the CCA, if the communications device detects, on the preset band resource in the unlicensed spectrum, a signal that is sent by the another communications device and that indicates a band resource that can be used by the another communications device in the unlicensed spectrum, determining, by the communications device, whether the unlicensed spectrum is in an idle state according to whether the band resource that can be used by the another communications device and the band resource that can be used by the communications device are a same band resource.

With reference to the sixth possible implementation manner of the third aspect, in a seventh possible implementation manner, the determining, by the communications device, whether the unlicensed spectrum is in an idle state according to whether the band resource that can be used by the another communications device and the band resource that can be used by the communications device are a same band resource includes:

if the communications device determines that the band resource that can be used by the another communications device and the band resource that can be used by the communications device are the same band resource, determining, by the communications device, that the unlicensed spectrum is in a non-idle state; or if the communications device determines that the band resource that can be used by the another communications device and the band resource that can be used by the communications device are not the same band resource, determining, by the communications device, that the unlicensed spectrum is in an idle state.

According to the method and the communications device that are provided in the embodiments of the present invention, the communications device performs CCA on an unlicensed spectrum; and when determining that the unlicensed spectrum is in an idle state, the communications device sends, on a preset band resource in the unlicensed spectrum, a signal indicating that the communications device uses the unlicensed spectrum. Because the communications device sends, only on the preset band resource in the unlicensed spectrum, the signal indicating that the communications device uses the unlicensed spectrum, and the preset band resource is a partial band resource in the unlicensed spectrum, data transmission of another communications device and/or determining of whether the unlicensed spectrum is idle by means of CCA detection by the another communications device is not affected, mutual interference between communications devices when the unlicensed spectrum is used is eliminated, and utilization of the unlicensed spectrum is further improved.

DESCRIPTION OF EMBODIMENTS

Figure 1:
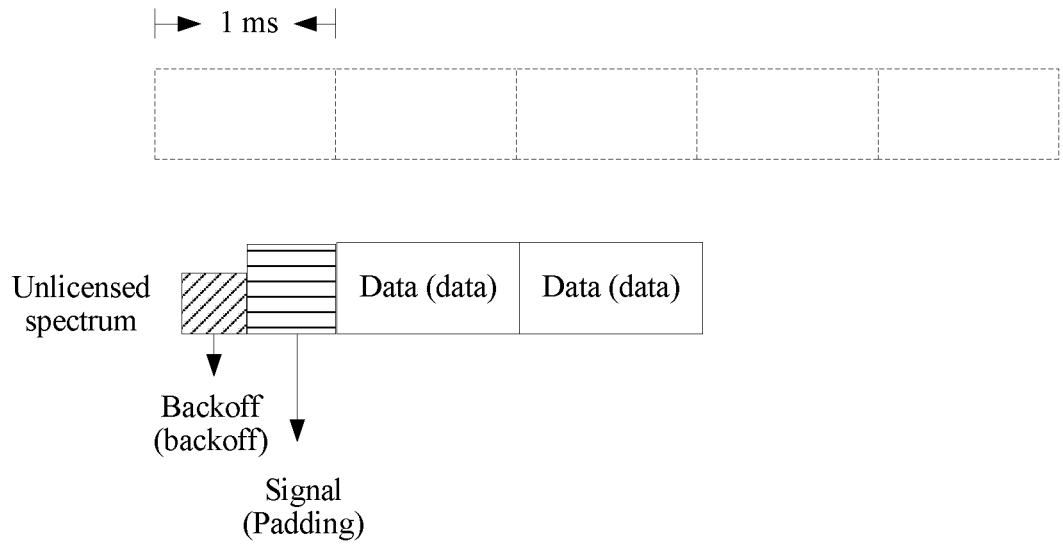
FIG. 1 is a schematic diagram of sending a padding by an LTE device after determining that a channel may be used.

Currently, a process of sending a preemption signal (Padding) on an unlicensed spectrum by an LTE device after determining that a monitored channel on the unlicensed spectrum is available and before starting to send data is shown in FIG. 1. The LTE device performs CCA on a backoff part shown in the figure to determine whether the unlicensed spectrum is idle. When the backoff part ends, if the LTE device determines that the unlicensed spectrum is in an idle state, the LTE device may send service data from the time at which a next subframe boundary arrives. To prevent another device from occupying the unlicensed spectrum, before the backoff ends and the next subframe boundary arrives, the LTE device may send the padding on the whole band of the unlicensed spectrum.

In the present invention, a communications device sends, on a preset band resource in an unlicensed spectrum, a signal indicating that the communications device uses the unlicensed spectrum, where the preset band resource is a partial band resource in the unlicensed spectrum. Because the signal indicating that the communications device uses the unlicensed spectrum is sent only on a partial band resource in the unlicensed spectrum, occurrence of interference between the communications device and another communications device when the unlicensed spectrum is used is avoided, so that the communications device can effectively use the unlicensed spectrum, and utilization of the unlicensed spectrum is further improved.

The communications device in embodiments of the present invention may be a communications device having a capability of performing data transmission on an unlicensed spectrum, and specifically includes an LTE base station and LTE user equipment, where the LTE base station may include a macro base station, a metro cell, a micro cell, a pico cell, and a femto cell, or may include a base station with wireless backhaul, for example, a relay. The communications device in the embodiments of the present invention may also be a device having a capability of performing data transmission on an unlicensed spectrum and supporting a centralized scheduling function, such as an LTE communications device, a Global System for Mobile Communications (GSM) device, a Code Division Multiple Access (CDMA) device, and a High Speed Downlink Packet Access (HSDPA)/High Speed Uplink Packet Access (HSUPA) device.

The expression "supporting a centralized scheduling function" herein means that, using the LTE base station as an example, the LTE base station may enable, by scheduling, multiple LTE user equipments served by the LTE base station to simultaneously perform data transmission, and in this sense, the LTE base station supports the centralized scheduling function; and in addition, the LTE user equipment implements simultaneous data transmission with another LTE user equipment by using received scheduling signaling, and in this sense, the LTE user equipment also supports the centralized scheduling function.

The following uses an example in which the communications device is an LTE device (including the LTE base station and the LTE user equipment), to list scenarios in which interference occurs when the communications device uses an unlicensed spectrum.

Figure 2:
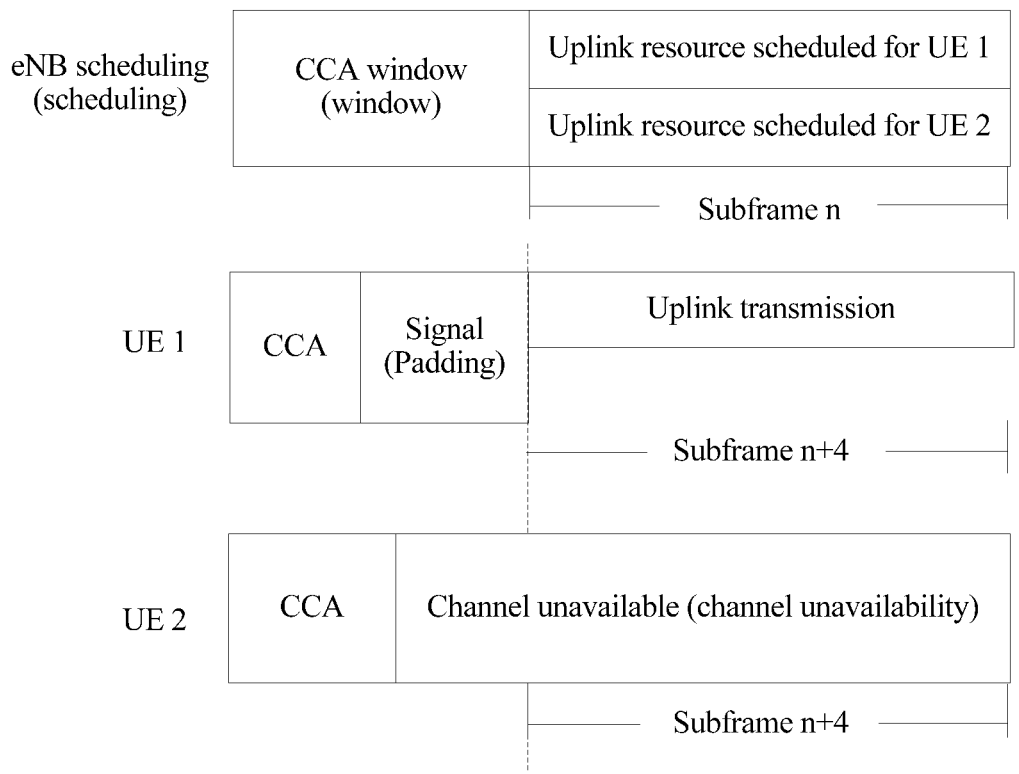
FIG. 2 is a schematic diagram of scheduling two UEs in a same subframe.

For example, assuming that in one subframe, an LTE device (a U-LTE eNB (Unlicensed-LTE evolved-NobeB) in FIG. 2, that is, an eNB supporting data transmission on the unlicensed spectrum) having the capability of performing data transmission on the unlicensed spectrum simultaneously schedules two user equipments (UE), and because of geographic locations, the two UEs can monitor signals sent by each other. The expression "can monitor signals sent by each other" herein means that when a signal sent by one UE arrives at the other UE, energy of the signal that is sent by the UE and that is received by the other UE is higher than a threshold, and vice versa. If no limitation is imposed on paddings sent by the two UEs, one of the UEs may be incapable of using a scheduled resource to perform data transmission. As shown in FIG. 2, UE 1 first completes CCA, and sends a padding, and after a subframe boundary arrives, the UE 1 performs data transmission on a resource scheduled by the U-LTE eNB. At the same time, during a process of performing CCA, UE 2 detects the padding sent by the UE 1, and determines that a channel is not idle. Therefore, even if the subframe boundary arrives, the UE 2 cannot send data on the resource scheduled by the U-LTE eNB. In this case, the Padding sent by the UE 1 causes false determining on CCA detection performed by the UE 2, and causes a waste of the resource scheduled by the U-LTE eNB and a data loss of the UE2. Therefore, the UE 2 cannot effectively use the unlicensed spectrum.

For another example, assuming that in two adjacent subframes, the LTE device having the capability of performing data transmission on the unlicensed spectrum successively schedules two UEs, and because of geographic locations, the two UEs can monitor signals sent by each other, and assuming that UE 1 is UE scheduled in a former subframe, and UE 2 is UE scheduled in a latter subframe. In this case, if no scheduling constraint is introduced, the UE 2 may always be incapable of detecting that the unlicensed spectrum is in an idle state, and therefore the UE 2 scheduled in the latter subframe cannot complete data transmission. Obviously, introducing a scheduling constraint can ensure that two UEs that can monitor the signals sent by each other may be successively scheduled in the two adjacent subframes. However, even if the scheduling constraint is introduced, for example, a resource (including a time resource and a frequency resource) occupied by the UE 1 to perform uplink data transmission does not occupy a full width of a frequency resource, if the padding sent by the UE 2 is not constrained, the padding sent by the UE 2 may interfere with the uplink data transmission performed by the UE 1, that is, on a side of the U-LTE eNB, the padding sent by the UE 2 may interfere with receiving of a latter part of uplink data of the UE 1, which causes a data loss of the UE 1, and therefore, the UE 1 cannot effectively use the unlicensed spectrum.

Figure 3:
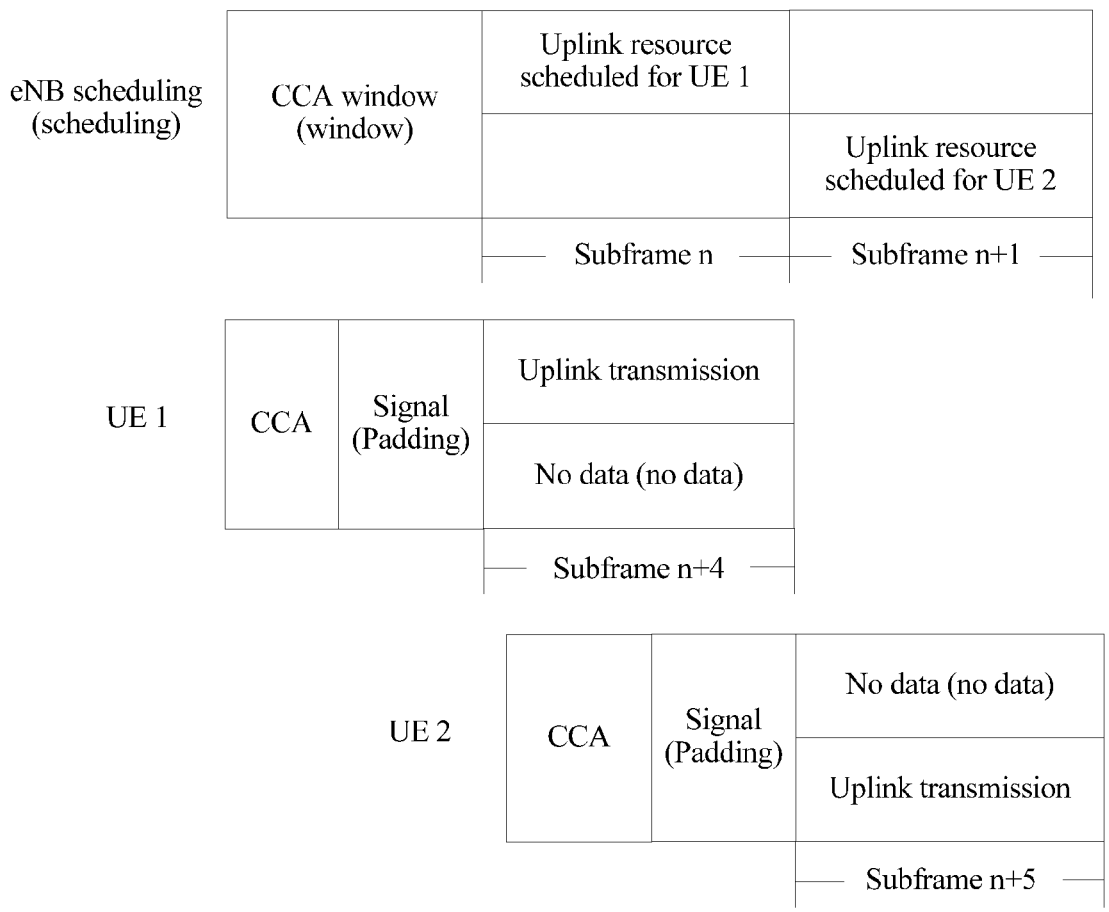
FIG. 3 is a schematic diagram of scheduling two UEs in different subframes.

For another example, assuming that in two adjacent subframes, the U-LTE eNB successively schedules two UEs in the two adjacent subframes, and because of geographic locations, the two UEs cannot monitor signals sent by each other. If paddings sent by the two UEs are not limited, the padding sent by UE scheduled in a latter subframe in the two adjacent subframes may interfere with uplink data transmission performed by UE scheduled in a former subframe. As shown in FIG. 3, it is assumed that UE 1 is the UE scheduled in the former subframe, and UE 2 is the UE scheduled in the latter subframe, and before performing uplink data transmission, the UE 2 performs CCA. Because the UE 2 cannot monitor the signal sent by the UE 1, after detecting, by performing the CCA, that a channel is idle, the UE 2 sends a padding. In this case, on a side of the U-LTE eNB, the padding sent by the UE 2 interferes with the receiving of the latter part of the uplink data of the UE 1, which causes the data loss of the UE 1, and therefore, the UE 1 cannot effectively use the unlicensed spectrum.

The following further describes the embodiments of the present invention in detail with reference to accompanying drawings in this specification. It should be understood that the embodiments described herein are merely used to describe and explain the present invention but are not intended to limit the present invention.

Figure 4:
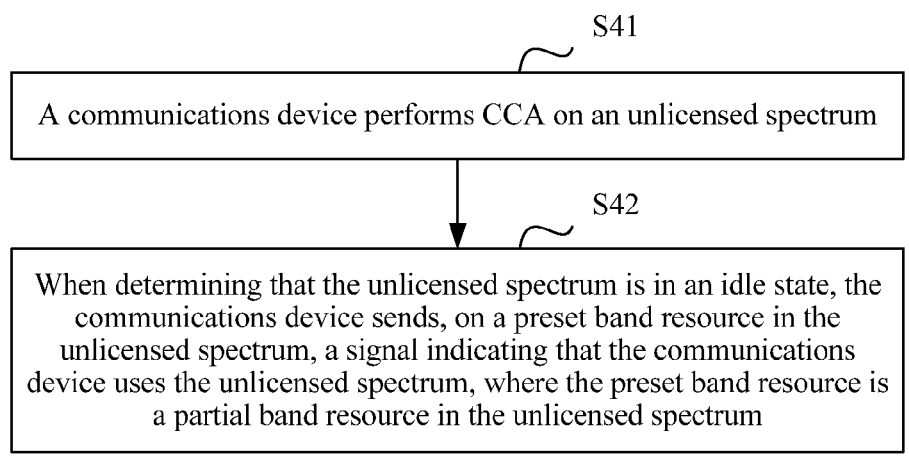
FIG. 4 is a schematic flowchart of a data transmission method according to an embodiment of the present invention.

An embodiment of the present invention provides a data transmission method. As shown in FIG. 4, the method includes:

S41. A communications device performs CCA on an unlicensed spectrum.

S42. When determining that the unlicensed spectrum is in an idle state, the communications device sends, on a preset band resource in the unlicensed spectrum, a signal indicating that the communications device uses the unlicensed spectrum, where the preset band resource is a partial band resource in the unlicensed spectrum.

In this embodiment of the present invention, the communications device performs the CCA on the unlicensed spectrum; and when determining that the unlicensed spectrum is in an idle state, the communications device sends, on the preset band resource in the unlicensed spectrum, the signal indicating that the communications device uses the unlicensed spectrum. Because the communications device sends, only on the preset band resource in the unlicensed spectrum, the signal indicating that the communications device uses the unlicensed spectrum, and the preset band resource is a partial band resource in the unlicensed spectrum, data transmission of another communications device and/or determining of whether the unlicensed spectrum is idle by means of CCA detection by the another communications device is not affected, mutual interference between communications devices when the unlicensed spectrum is used is eliminated, and utilization of the unlicensed spectrum is further improved.

In this embodiment of the present invention, the unlicensed spectrum may also be referred to as a license-free spectrum, which may be a spectrum free of charge. A characteristic of the unlicensed spectrum is that the unlicensed spectrum may be shared by multiple types of wireless data communications systems. The multiple types of wireless data communications systems may be multiple wireless data communications systems that belong to different operators and that use a same radio access technology (RAT), or may be multiple wireless data communications systems using different radio access technologies. The radio access technology herein includes but is not limited to an LTE technology, a Wireless Fidelity (WiFi) technology, a GSM technology, and a CDMA technology. Before using an unlicensed spectrum, the wireless data communications system may first sense a status of the unlicensed spectrum. Oppositely, a licensed spectrum is a spectrum allocated to a wireless data communications system in which a scheduled node (such as user equipment and an LTE base station) is located for use.

It should be noted that in S41, the CCA operation performed on the unlicensed spectrum is intended to determine whether the unlicensed spectrum is in an idle state. In the present invention, the CCA may also be replaced with channel available check (CAC) performed on the unlicensed spectrum, which is also intended to determine whether the unlicensed spectrum is in an idle state. In other words, in the present invention, performing the CCA on the unlicensed spectrum by the communications device further includes performing, by the communications device on the unlicensed spectrum, the CAC or another operation capable of determining whether the unlicensed spectrum is in an idle state.

It should be noted that the term "idle state" may mean that the unlicensed spectrum is not used by any communications device, or may mean that even if the unlicensed spectrum is used by some communications devices (for example, a communications device A), if signal energy of a signal sent by the communications device A when the signal arrives at another communications device (for example, a communications device B) is lower than a threshold, the communications device B may also consider that the unlicensed spectrum is idle.

It should be noted that the expression "the signal indicating that the communications device uses the unlicensed spectrum" herein means that another communications device may determine, only by performing energy detection on the signal, that is, received energy of the signal arriving at the another communications device, whether the communications device has occupied the unlicensed spectrum. Use of the unlicensed spectrum by the communications device herein may be use of a part or all of the unlicensed spectrum.

Preferably, the preset band resource in this embodiment of the present invention includes the following two preferred implementation manners.

Manner a: The preset band resource is a band resource that is in the unlicensed spectrum and that is specified to be used only to send the signal indicating that the communications device uses the unlicensed spectrum (that is, a semi-statically reserved band resource).

In this manner, preferably, the band resource that is in the unlicensed spectrum and that is specified to be used only to send the signal indicating that the communications device uses the unlicensed spectrum is a partial or the whole band resource of a band resource that is in the unlicensed spectrum and that cannot be used by any communications device for service data transmission. It should be noted that the band resource that is in the unlicensed spectrum and that cannot be used by any communications device for service data transmission means that the band resource is not used to send data related to a service of a communications device, but send only the signal indicating that the communications device uses the unlicensed spectrum. For example, for an LTE device, data related to a communication service includes data carried in a physical downlink shared channel (PDSCH) and data carried in a physical uplink shared channel (PUSCH).

In this manner, different communications devices are configured on a same band resource to send the signal indicating that the communications device uses the unlicensed spectrum. Particularly, when the communications device is LTE user equipment, the semi-statically reserved band resource can be used to send a signal indicating that the LTE device uses the unlicensed spectrum.

In this manner, the preset band resource may be a band resource including resource elements (RE) of a quantity of a positive integer, or subcarriers of a quantity of a positive integer, or resource blocks (RB) of a quantity of a positive integer in one time unit in the band resource that is in the unlicensed spectrum and that cannot be used by any communications device for service data transmission. In an LTE system, the one time unit herein may be an orthogonal frequency division multiplexing (OOFDM) symbol, a timeslot (slot), a subframe, or a radio frame. Preferably, the preset band resource may also be a band resource including REs of a quantity of a positive integer, or subcarriers of a quantity of a positive integer, or RBs of a quantity of a positive integer in multiple consecutive time units, or REs of a quantity of a positive integer, or subcarriers of a quantity of a positive integer, or RBs of a quantity of a positive integer in multiple non-consecutive time units in the band resource that is in the unlicensed spectrum and that cannot be used by any communications device for service data transmission.

In this manner, each communications device sends, on the band resource that is in the unlicensed spectrum and that is specified to be used only to send the signal indicating that the communications device uses the unlicensed spectrum, a signal indicating that the communications device uses the unlicensed spectrum, and the band resource specified to be used only to send the signal indicating that the communications device uses the unlicensed spectrum is the band resource that is in the unlicensed spectrum and that cannot be used by any communications device for service data transmission. Therefore, when the communications device sends the signal indicating that the communications device uses the unlicensed spectrum, data transmission of another communications device is not affected, mutual interference between communications devices when the unlicensed spectrum is used is eliminated, and utilization of the unlicensed spectrum is further improved.

Manner b: The preset band resource is a band resource in the unlicensed spectrum, where the band resource and a band resource that can be used by the communications device have a same frequency-domain location but different time-domain locations.

Preferably, in this manner, when sending, on the band resource in the unlicensed spectrum, where the band resource and the band resource that can be used by the communications device have the same frequency-domain location but different time-domain locations, the signal indicating that the communications device uses the unlicensed spectrum, the communications device may send the signal on a the whole band resource of the band resource in the unlicensed spectrum, where the band resource and the band resource that can be used by the communications device have the same frequency-domain location but different time-domain locations, or may send the signal on a partial band resource of the band resource in the unlicensed spectrum, where the band resource and the band resource that can be used by the communications device have the same frequency-domain location but different time-domain locations.

In this manner, when the communications device is LTE user equipment, a band resource that can be used by the LTE user equipment may be a band resource on which the LTE user equipment is scheduled, and the preset band resource is a band resource in the unlicensed spectrum, where the band resource and the band resource on which the LTE user equipment is scheduled have a same frequency-domain location but different time-domain locations. Specifically, assuming that the band resource on which the LTE user equipment is scheduled is an $M^{th}$ RB in an $N^{th}$ subframe in a radio frame, the preset band resource may be an $M^{th}$ RB in a $K^{th}$ subframe in a radio frame, where if the radio frame in which the $N^{th}$ subframe is located and the radio frame in which the $K^{th}$ subframe is located are not a same radio frame, K may be equal to N, or may be unequal to N; or if the radio frame in which the $N^{th}$ subframe is located and the radio frame in which the $K^{th}$ subframe is located are a same radio frame, K is unequal to N. It should be noted that, in this example, the subframe represents a time unit in which the LTE user equipment may be scheduled, and the time unit may also be an OFDM symbol, a timeslot, a radio frame, or the like. The RB represents a frequency unit in which the LTE user equipment may be scheduled, and the frequency unit may also be a subcarrier, an RB pair, an RE, or the like.

In this manner, when the communications device is an LTE base station, a band resource that can be used by the LTE base station may be a band resource used by the LTE base station, and the preset band resource is a band resource in the unlicensed spectrum, where the band resource and the band resource used by the LTE base station have a same frequency-domain location but different time-domain locations. For example, it is assumed that an LTE base station detects that an unlicensed spectrum is in an idle state. However, considering a service transmission requirement of the LTE base station, the LTE base station needs to occupy only a part of the unlicensed spectrum to meet the service transmission requirement of the LTE base station. In this case, the LTE base station may occupy only a part of the unlicensed spectrum to perform data transmission, and the part of the unlicensed spectrum herein is the band resource used by the LTE base station.

It should be noted that sometimes the LTE user equipment may also serve as an LTE base station, for example, in device-to-device (D2D) communication, the LTE user equipment may serve as an LTE base station, and has a data scheduling function. Sometimes the LTE base station may also serve as LTE user equipment, for example, for an LTE base station with wireless backhaul, for example, a Relay, a scheduled resource also needs to be obtained from a base station with wired backhaul. In this sense, the LTE base station with wireless backhaul may also be considered as LTE user equipment.

Based on any one of the foregoing embodiments, in this embodiment of the present invention, the signal that is sent by the communications device and that indicates that the communications device uses the unlicensed spectrum may include information useful for data transmission. For example, the sent signal indicating that the communications device uses the unlicensed spectrum includes information for implementing unlicensed spectrum synchronization, and may further include control information on the unlicensed spectrum, such as information carried in a physical broadcast channel (PBCH), a system information block type 1 (SIB1), other system information block types SIBs, and a physical control format indicator channel (PCFICH) that are in the existing LTE system. Further, the sent signal indicating that the communications device uses the unlicensed spectrum herein may also be understood as a first channel, and in this case, the first channel may directly be sent by the foregoing channels or any combination of the foregoing channels, or be repeatedly sent by any one of the foregoing channels. The sent signal indicating that the communications device uses the unlicensed spectrum may also be a reference signal. For example, in the existing LTE system, the reference signal may be a cell-specific reference signal (CRS), a channel state information-reference signal (CSI-RS), a discovery reference signal (DRS), or the like. The sent signal indicating that the communications device uses the unlicensed spectrum may also be a primary synchronization signal (PSS), or may be a secondary synchronization signal (SS). The sent signal indicating that the communications device uses the unlicensed spectrum may also be a signal having no relationships with service data transmission and data demodulation. In conclusion, a purpose of sending the signal indicating that the communications device uses the unlicensed spectrum is to enable another device to determine, by performing energy detection on the signal, that a communications device is using the unlicensed spectrum. Particularly, when the preset band resource is a band resource that is in the unlicensed spectrum and that is corresponding to a band resource that can be used by the communications device, another device may determine, by performing energy detection on a signal indicating that a communications device uses the unlicensed spectrum, that a communications device is using partial bandwidth of the unlicensed spectrum, where the partial bandwidth is corresponding to bandwidth in which the signal indicating that the communications device uses the unlicensed spectrum is sent, that is, a same frequency-domain location but different time-domain locations.

It should be noted that when the sent signal indicating that the communications device uses the unlicensed spectrum includes the information useful for data transmission, a sending format of the signal may be different from a sending format of the information useful for data transmission in the existing LTE system. For example, when the signal indicating that the communications device uses the unlicensed spectrum is a PSS, a sending format of the PSS in the existing LTE system is occupation of six RBs in an entire band resource center. In a frequency division duplex (FDD) system, the PSS is sent on a location of a seventh OFDM symbol in a first subframe and a sixth subframe that are in each radio frame. When the signal indicating that the communications device uses the unlicensed spectrum is the PSS, the PSS may be sent on all OFDM symbols in a preset band resource before a next subframe boundary arrives.

The communications device sends, on the preset band resource in the unlicensed spectrum, the signal indicating that the communications device uses the unlicensed spectrum, data transmission of another communications device on another band resource in the unlicensed spectrum is not affected, and the another communications device may perform CCA detection only on a band resource that can be used by the another communications device. Therefore, the signal indicating that a communications device uses the unlicensed spectrum is not detected, so that false determining on usage of the unlicensed spectrum by the LTE device is avoided.

In implementation, the communications device may learn, by using explicit signaling, information about the preset band resource on which the signal indicating that the communications device uses the unlicensed spectrum is sent, or may learn, by using implicit signaling, the information about the preset band resource on which the signal indicating that the communications device uses the unlicensed spectrum is sent, or the communications device may further voluntarily configure the information. Detailed description is as follows.

In an example in which the communications device is LTE UE, when the preset band resource is corresponding to a band resource that is in the unlicensed spectrum and in which the LTE UE is scheduled, a base station serving the LTE UE schedules, by using uplink scheduling signaling (for example, UL grant), the LTE UE to send uplink data on the unlicensed spectrum, and may instruct, by using physical layer signaling, the LTE UE to send, on the preset band resource, the signal indicating that the communications device uses the unlicensed spectrum, where a time location of the preset band resource may be a time period 1. The time period 1 refers to a time period starting from a time when the LTE UE initiates CCA to determine that the unlicensed spectrum can be used to a time before arrival of a subframe boundary that is used for data transmission and in which the LTE UE is scheduled, or refers to a time period starting from a time when the LTE UE initiates CCA to determine that an unlicensed spectrum in which the UE is scheduled can be used to a time before arrival of a subframe boundary that is used for data transmission and in which the LTE UE is scheduled. The time location of the preset band resource may also be a subset of the time period 1, and a frequency location of the preset band resource is described above, and the preset band resource has a same frequency-domain location as the band resource on which the LTE UE is scheduled.

An explicit signaling notification method includes: a base station to which the LTE UE belongs notifies the LTE UE by using physical layer signaling, for example, the base station notifies, by using a physical downlink control channel (PDCCH), and by reinterpreting original bit information or by using newly-added bit information, the LTE UE of a time-frequency resource location for sending a signal indicating that the LTE UE uses the unlicensed spectrum. The base station may also notify, by using another physical layer channel such as an enhanced physical downlink control channel (E-PDCCH), a physical hybrid-ARQ indicator channel (PHICH), or a PCFICH, the LTE UE of the time-frequency resource location for sending the signal indicating that the LTE UE uses the unlicensed spectrum. The physical layer signaling may be sent by using an unlicensed spectrum, or may be sent by means of cross-carrier scheduling by using a licensed spectrum. The explicit signaling notification method further includes: the base station notifies, by using radio resource control signaling (RRC), the UE of a correspondence between a band resource used for sending the signal indicating that the UE uses the unlicensed spectrum and the band resource on which the UE is scheduled. The RRC signaling may be broadcast signaling, or may be user-specific signaling, which is not limited herein. After the UE establishes a data link to the base station by using a licensed or an unlicensed spectrum, the base station may notify, by using the RRC signaling, the UE of the band resource used for sending, on the unlicensed spectrum, the signal indicating that the UE uses the unlicensed spectrum. When the UE needs to send the signal indicating that the UE uses the unlicensed spectrum (for example, before sending uplink service data, the UE performs CCA on an unlicensed spectrum, and after determining that a channel may be used, the UE may send the signal indicating that the UE uses the unlicensed spectrum), the UE may learn, according to content notified by using the RRC signaling, the band resource used for sending the signal indicating that the UE uses the unlicensed spectrum, and further send the signal indicating that the UE uses the unlicensed spectrum. It should be noted that in an explicit signaling notification manner, if the UE does not receive an explicit signaling notification, the UE may send, by default on a resource that is not corresponding to the band resource on which the UE is scheduled, the signal indicating that the UE uses the unlicensed spectrum. For example, if the band resource on which the UE is scheduled is not a the whole band resource, the UE may send, on a the whole band resource, the signal indicating that the UE uses the unlicensed spectrum.

An implicit signaling notification manner may be combined with a factory setting. For example, when UE leaves factory, it is configured that if the signal indicating that the UE uses the unlicensed spectrum is sent on the unlicensed spectrum, the band resource on which the signal indicating that the UE uses the unlicensed spectrum is sent is corresponding to the band resource on which the UE is scheduled, and likewise, it indicates that a time location in which the signal indicating that the UE uses the unlicensed spectrum is sent is also implemented by means of initial setting. Therefore, after the UE receives scheduling signaling (for example, UL grant) for performing uplink data transmission on the unlicensed spectrum, or when the UE itself has a requirement for uplink data service transmission, after it is determined, by means of CCA, that a channel may be used, the UE may directly send, on a corresponding location according to a factory-set criterion, the signal indicating that the UE uses the unlicensed spectrum. The foregoing factory setting may also be stipulated in a standard protocol, or may be centrally configured on a network side. It should be noted that when the implicit signaling notification manner is used, the UE may further be notified by using other signaling, and a rule of sending, on the preset band resource, the signal indicating that the UE uses the unlicensed spectrum is invalid, that is, if the UE receives the foregoing signaling, the UE may send, on the band resource that is not corresponding to the band resource on which the UE is scheduled, the signal indicating that the UE uses the unlicensed spectrum. Further, the other signaling may further notify the UE of a specific band resource location in which the signal indicating that the UE uses the unlicensed spectrum is sent, so that the UE may learn some band resources on which the signal indicating that the UE uses the unlicensed spectrum should be sent.

It should be noted that in the present invention, a time location occupied by the communications device to send the signal indicating that the communications device uses the unlicensed spectrum may be described above, that is, the time period 1, or may be the subset of the time period 1, which may be implemented by stipulation in a standard protocol, or may be implemented by means of factory setting of a communications device, or may be implemented by configuration on a network side, or may be implemented by using an extra signaling indication, which is not limited herein.

Still in an example in which the communications device is UE in an LTE system, when the preset band resource is a semi-statically reserved band resource, a location of the semi-statically reserved band resource may first be configured for the UE by using the RRC signaling. Then the UE is notified, by using the explicit signaling or the implicit signaling, of a taking-effect time of the location of the semi-statically reserved band resource, that is, a time when the UE sends, by using the semi-statically reserved band resource, the signal indicating that the UE uses the unlicensed spectrum. Preferably, an explicit signaling manner is to introduce new physical layer signaling, or reinterpret existing physical layer signaling to indicate a taking-effect time when the UE sends, by using the semi-statically reserved band resource, the signal indicating that the LTE UE uses the unlicensed spectrum. In the implicit signaling manner, for example, by using secondary cell (Scell) activation signaling, the UE knows that the UE is to be scheduled on an S cell, and in this case, it may be understood as taking-effect of a semi-static reservation manner (that is, manner a); or when an eNB indicates, by using signaling, that the UE is scheduled on the unlicensed spectrum, before sending data, the UE needs to send, on the semi-statically reserved band resource, the signal indicating that the UE uses the unlicensed spectrum, that is, when the UE learns that the UE is scheduled on the unlicensed spectrum, the UE learns that sending, on the semi-statically reserved band resource, the signal indicating that the UE uses the unlicensed spectrum takes effect; or by using Scell configuration signaling, that is, when the UE learns that the unlicensed spectrum is configured, it may be considered that sending, on the semi-statically reserved band resource, the signal indicating that the UE uses the unlicensed spectrum takes effect, and when the UE needs to send the signal indicating that the UE uses the unlicensed spectrum, the UE uses the semi-statically reserved band resource to send the signal.

In another example in which the communications device is an LTE eNB, preferably, the preset band resource is a band resource that is in the unlicensed spectrum and that is corresponding to a band resource that can be used by the LTE eNB. A benefit is that an LTE eNB defined in a current protocol performs scheduling based on a frequency domain resource, that is, in a time unit, for example, in a subframe, scheduling on the frequency domain resource by the LTE eNB is based on frequency division multiplexing (FDM). Therefore, even if the LTE eNB detects that all band resources of an unlicensed spectrum are in an available state, considering a service transmission requirement in the subframe, the LTE eNB needs to occupy only a partial band resource of the unlicensed spectrum to meet a service requirement of the LTE eNB. Therefore, to ensure utilization efficiency of the unlicensed spectrum, the LTE eNB may send, only on the band resource corresponding to the band resource that can be used by the LTE eNB, a signal indicating that the LTE eNB uses the unlicensed spectrum. In this case, if another LTE eNB also has a service transmission requirement, the another LTE eNB may occupy a band resource that is in the unlicensed spectrum and that is not occupied by the LTE eNB. In this example, for the LTE eNB, a time resource location in which the signal indicating that the LTE eNB uses the unlicensed spectrum is sent may be the same as that in the foregoing description of the LTE UE. A frequency domain resource location in which the signal indicating that the LTE eNB uses the unlicensed spectrum is sent may be learned by the LTE eNB in a predefined manner, such as stipulation in a standard protocol, centralized configuration on a network side, and factory setting. A benefit of using the predefined manner is that even if the LTE eNB belongs to different operators, a frequency domain resource on which the signal indicating that the LTE eNB uses the unlicensed spectrum is sent is identically understood, thereby helping the LTE eNBs of different operators effectively use the unlicensed spectrum.

In this manner, the communications device sends, on a band resource in the unlicensed spectrum, where the band resource and the band resource that can be used by the communications device have a same frequency-domain location but different time-domain locations, the signal indicating that the communications device uses the unlicensed spectrum, and orthogonal separation of frequency domain resources that can be used by different communications devices in the unlicensed spectrum is generally implemented in an FDM manner. Therefore, data transmission of another communications device is not affected, determining of whether the unlicensed spectrum is idle by means of CCA detection by the another communications device is either not affected, mutual interference between communications devices when the unlicensed spectrum is used is eliminated, and utilization of the unlicensed spectrum is further improved.

In implementation, in S41, performing, by the communications device, the CCA on the unlicensed spectrum includes the following two preferred manners.

Manner 1: The communications device performs the CCA on the preset band resource in the unlicensed spectrum.

The preset band resource may be a band resource that is in the unlicensed spectrum and that is specified to be used only to send a signal indicating that the communications device uses the unlicensed spectrum (that is, a semi-statically reserved band resource), or may be a band resource that is in the unlicensed spectrum and that is corresponding to a band resource that can be used by the communications device.

In this manner, a band resource on which the CCA is performed may be an entirety of the preset band resource in the unlicensed spectrum, or may be a subset of the preset band resource in the unlicensed spectrum. The communications device may learn, in advance, a correspondence between the band resource on which the communications device performs the CCA and the preset band resource in the unlicensed spectrum. Specifically, the correspondence between the band resource on which the CCA is performed and the preset band resource in the unlicensed spectrum may be learned by the communications device by means of stipulation in a standard protocol, centralized configuration on a network side, factory setting, physical layer signaling notification, or RRC signaling notification.

Figure 5:
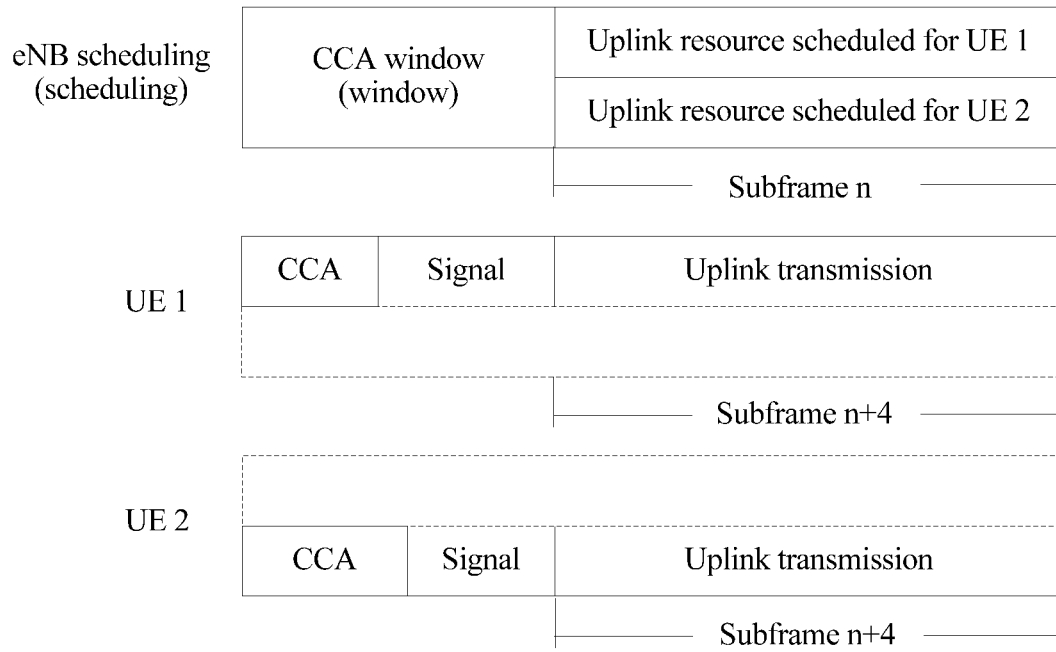
FIG. 5 is a schematic diagram of performing CCA and sending a signal indicating that a communications device uses an unlicensed spectrum on a same band resource by the communications device according to an embodiment of the present invention.

Preferably, the band resource on which the communications device performs the CCA and the band resource on which the signal indicating that the communications device uses the unlicensed spectrum is sent are a same band resource, as shown in FIG. 5.

In this manner, in an example in which the communications device is LTE UE, when the preset band resource is a band resource that is in the unlicensed spectrum and that is corresponding to a band resource on which the LTE UE is scheduled, the LTE UE may perform CCA only on the band resource corresponding to the band resource on which the LTE UE is scheduled, and further determine whether the band resource on which the LTE UE is scheduled is idle on the unlicensed spectrum. It should be noted that a start time and an end time of the CCA may be set by a communications device, for example, an LTE eNB, or may be set by the LTE UE. A corresponding start time and a corresponding end time of the CCA are set according to a random backoff mechanism and criterion.

For another example, in an example in which the communications device is an LTE eNB, when the preset band resource is a band resource that is in the unlicensed spectrum and that is corresponding to a band resource that can be used by the LTE eNB, the LTE eNB performs the CCA only on the band resource that is in the unlicensed spectrum and that is corresponding to the band resource that can be used by the LTE eNB, and a start time and an end time of the CCA may be configured on the network side, or be stipulated in the standard protocol, or the LTE eNB sets a corresponding start time and a corresponding end time of the CCA according to the random backoff mechanism and criterion, which is not limited herein.

For another example, in an example in which the communications device is LTE UE, when the preset band resource is the semi-statically reserved band resource (that is, the band resource that is in the unlicensed spectrum and that is specified to be used only to send a signal indicating that the LTE UE uses the unlicensed spectrum), the LTE UE performs the CCA on the semi-statically reserved band resource, and the start time and the end time of the CCA may be set by the LTE eNB, or may be set by the LTE UE. A corresponding start time and a corresponding end time of the CCA are set according to the random backoff mechanism and criterion. Particularly, when the LTE eNB schedules, in two adjacent subframes, UEs that cannot monitor each other, and schedules, in a latter subframe in the two adjacent subframes, at least two UEs that can monitor each other, the at least two UEs scheduled in the latter subframe of the two adjacent subframes may send, on the semi-statically reserved band resource, the signal indicating that the LTE UE uses the unlicensed spectrum. However, to ensure that the at least two UEs can both use the unlicensed spectrum to perform data transmission in the latter subframe, the LTE eNB may further limit a start time and an end time of CCA of the at least two UEs. For example, the at least two UEs start to perform the CCA at a same start time, and stop the CCA at a same end time. By limiting the start time and the end time of the CCA, multiple communications devices scheduled in a same subframe all perform CCA in a time range from a stipulated start time to a stipulated end time, so as to avoid data interference between the communications devices scheduled in the same subframe. The communications devices may learn, in advance, the stipulated start time and the stipulated end time.

Manner 2: The communications device performs the CCA on a the whole band resource in the unlicensed spectrum, that is, the communications device may perform broadband CCA in the unlicensed spectrum.

This manner applies to a scenario in which multiple communications devices are scheduled in a same subframe, and also applies to a scenario in which different communications devices are respectively scheduled in different subframes.

In this manner, in the scenario in which multiple communications devices are scheduled in the same subframe, preferably, the communications devices perform the CCA in the time range from the stipulated start time to the stipulated end time, that is, different communications devices all start to perform the CCA at a same start time, and stop the CCA at a same end time. By limiting the start time and the end time of the CCA, multiple communications devices scheduled in a same subframe all perform CCA in a time range from a stipulated start time to a stipulated end time, so as to avoid data interference between the communications devices scheduled in the same subframe. The communications devices may learn, in advance, the stipulated start time and the stipulated end time.

Figure 6A:
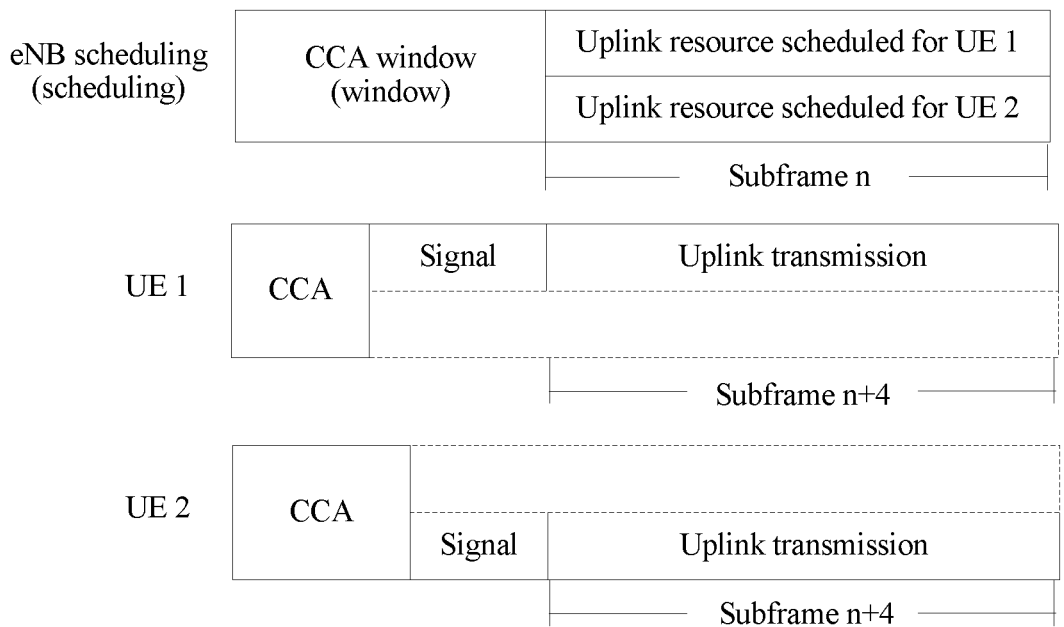
FIG. 6A is a schematic diagram of CCA detection having a same start time but different end times according to an embodiment of the present invention.
Figure 6B:
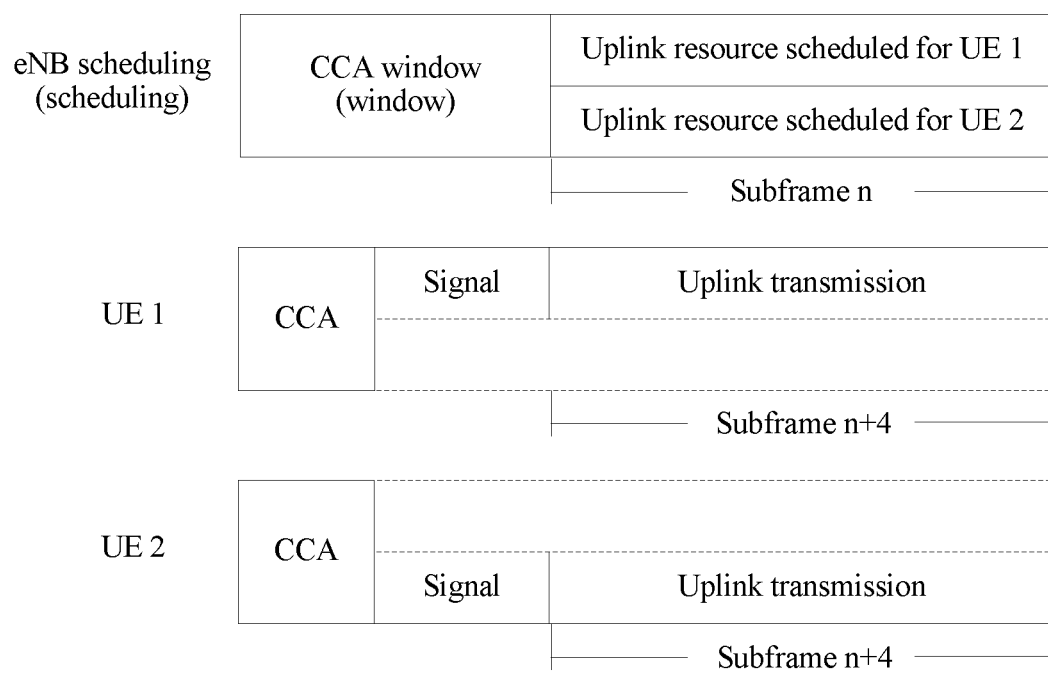
FIG. 6B is a schematic diagram of CCA detection having a same start time and a same end time according to an embodiment of the present invention.

The LTE UE is used as an example for description. If UE 1 and UE 2 perform the CCA at a same start time but stop the CCA at different moments, when performing the CCA, the UE 2 detects a signal that is sent by the UE 1 and that indicates that the UE 1 uses an unlicensed spectrum, as shown in FIG. 6A. In this case, the UE 2 considers that the unlicensed spectrum is in a non-idle state, and does not occupy a band resource that is in the unlicensed spectrum and on which the UE 2 is scheduled, and therefore the UE 2 cannot effectively use the unlicensed spectrum. If the start time and the end time of the CCA are limited, the UE 1 and the UE 2 start the CCA at a same moment, and stop the CCA at a same moment, and therefore, neither of the UEs detects, during the CCA, a signal of the other UE indicating that a communications device uses the unlicensed spectrum, as shown in FIG. 6B, so that both the UE 1 and the UE 2 can occupy band resources that are in the unlicensed spectrum and on which the UE 1 and the UE 2 are scheduled to perform data transmission.

Figure 7:
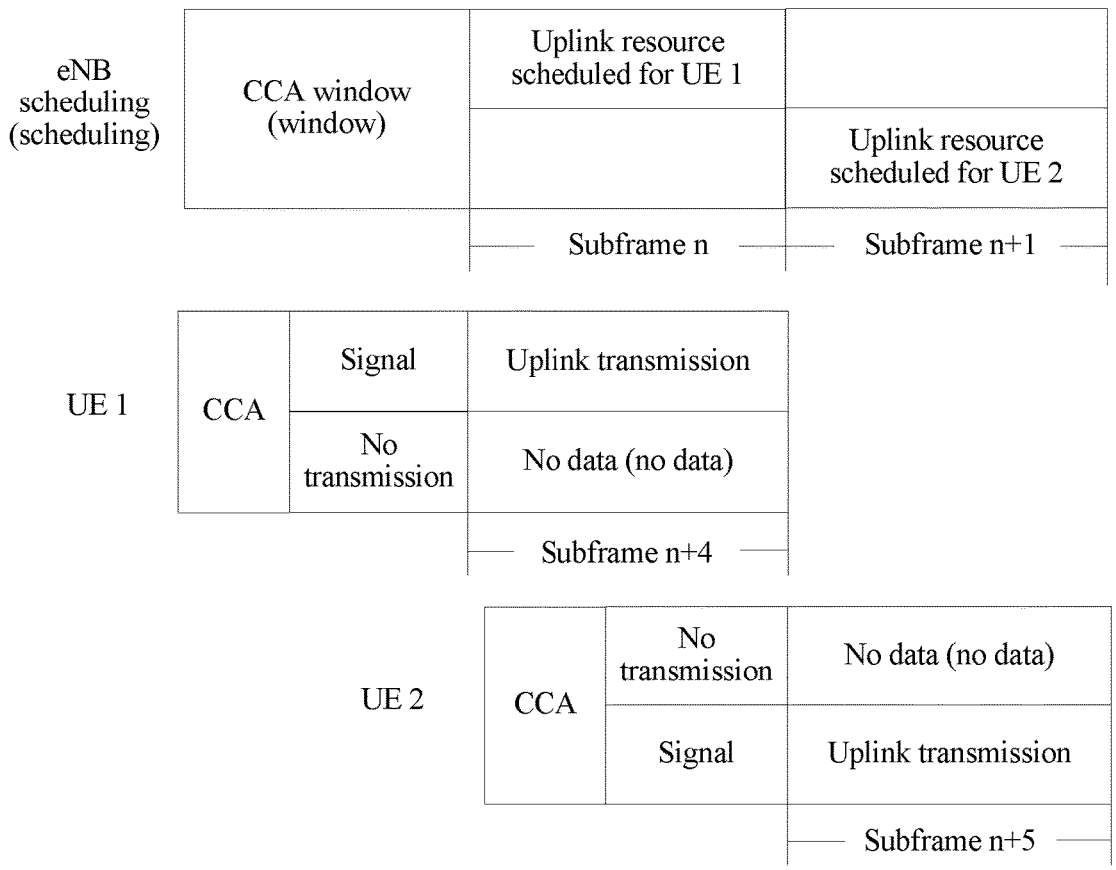
FIG. 7 is a schematic diagram of performing broadband CCA according to an embodiment of the present invention.

In the scenario in which different communications devices are respectively scheduled in different subframes, as shown in FIG. 7, the UE 1 and the UE 2 may perform broadband CCA. If a signal that is sent by another communications device and that indicates that the another communications device uses the unlicensed spectrum is not detected on the unlicensed spectrum, or within a scope of the broadband CCA, energy of a detected signal indicating that the another communications device uses the unlicensed spectrum is lower than a threshold, the signal indicating that the communications device uses the unlicensed spectrum may be sent on a preset band resource, which indicates that the unlicensed spectrum is occupied to perform service data transmission. The occupied unlicensed spectrum may be a the whole band resource in the unlicensed spectrum, or may be a partial band resource, which is not limited herein.

In this manner, the start time and the end time of the CCA may also be obtained in a manner similar to the manner 1, and details are not described herein again.

In this embodiment of the present invention, preferably, after determining, by the communications device, that the unlicensed spectrum is in an idle state, the method further includes:

sending, by the communications device on another band resource in the unlicensed spectrum except the preset band resource, a signal indicating a band resource that can be used by the communications device in the unlicensed spectrum.

Specifically, the communications device sends, on a preset band in the unlicensed spectrum, the signal indicating that the communications device uses the unlicensed spectrum, and sends, on the another band resource in the unlicensed spectrum except the preset band resource, the signal indicating the band resource that can be used by the communications device in the unlicensed spectrum. In this case, the signal indicating the band resource that can be used by the communications device in the unlicensed spectrum is not sent on the preset band in the unlicensed spectrum, and the signal indicating that the communications device uses the unlicensed spectrum is not sent on the another band resource in the unlicensed spectrum except the preset band resource.

Preferably, the signal indicating the band resource that can be used by the communications device in the unlicensed spectrum includes the following two preferred implementation manners.

Manner 1: The signal indicating the band resource that can be used by the communications device in the unlicensed spectrum includes identification information of the band resource that can be used by the communications device in the unlicensed spectrum.

In this manner, the communications device directly sends, on the another band, the identification information of the band resource that can be used by the communications device.

Manner 2: The signal indicating the band resource that can be used by the communications device in the unlicensed spectrum is a signal on which modulation and/or encoding processing is performed by using identification information of the band resource that can be used by the communications device in the unlicensed spectrum as a scrambling code.

Preferably, the communications device may use, on the another band, the identification information of the band resource that can be used by the communications device in the unlicensed spectrum as the scrambling code to perform the modulation and/or encoding on the signal that is sent by the communications device and that indicates that the communications device uses the unlicensed spectrum. The modulation herein may be: the signal indicating that the communications device uses the unlicensed spectrum is multiplied by the scrambling code, and the encoding may be an encoding operation performed on both the scrambling code and the signal that is sent by the communications device and that indicates that the communications device uses the unlicensed spectrum.

Certainly, in this manner, the communications device may use, on the another band, the identification information of the band resource that can be used by the communications device in the unlicensed spectrum as the scrambling code to perform modulation and/or encoding on another signal sent by the communications device, so as to obtain the signal indicating the band resource that can be used by the communications device in the unlicensed spectrum.

It should be noted that specific content sent by the signal indicating the band resource that can be used by the communications device in the unlicensed spectrum may be stipulated in a standard protocol, or may be centrally configured on a network side, or may be factory-set, or may be notified to the communications device by using physical layer signaling or RRC signaling.

For another wireless communications device on the unlicensed spectrum, for example, a WiFi device, CCA is usually performed on broadband (that is, on a the whole band resource of the unlicensed spectrum). In this case, if a communications device (for example, an LTE device) sends, on a partial band resource on the unlicensed spectrum, a signal indicating that the communications device uses the unlicensed spectrum, determining by the WiFi device on usage of the unlicensed spectrum may be affected. Because energy of the signal that is sent by the communications device on a partial band resource and that indicates that the communications device uses the unlicensed spectrum concentrates only on a partial band resource, even if the communications device sends the signal indicating that the communications device uses the unlicensed spectrum, a nearby WiFi device considers, by mistake, that the unlicensed spectrum is in an idle state and occupies the unlicensed spectrum when performing CCA (for example, energy detection) on the unlicensed spectrum, and therefore data transmission of the communications device is still affected. The foregoing problem may be resolved by sending, by the communications device on another band resource in the unlicensed spectrum except the band resource on which the signal indicating that the communications device uses the unlicensed spectrum is sent, the signal indicating the band resource that can be used by the communications device in the unlicensed spectrum.

For example, an example in which the communications device is LTE UE is used for description. It is assumed that the band resource in the unlicensed spectrum includes a band resource 1 to a band resource 5, and a time-frequency resource that is used for uplink data transmission and on which the LTE UE is scheduled is located on the band resource 1 within a specific time. Before sending uplink data, the LTE UE first performs CCA on the scheduled band resource 1, and then determines whether the scheduled band resource on the unlicensed spectrum can be used. If the scheduled band resource on the unlicensed spectrum can be used, from determining that the scheduled band resource 1 on the unlicensed spectrum can be used and before arrival of a subframe boundary for sending the uplink data, the LTE UE sends, on a band resource corresponding to the band resource 1, a signal indicating that the LTE UE uses the unlicensed spectrum, so that another device (for example, another LTE device) supporting CCA performed on a partial band resource may determine, by performing energy detection at least on the signal that is sent on the band resource corresponding to the band resource 1 and that indicates that the LTE UE uses the unlicensed spectrum, whether the band resource 1 is used by another communications device. The term "a specific time" herein may be a subframe and multiple consecutive subframes. For example, according to a current LTE protocol, if the LTE UE receives, in a $k^{th}$ subframe, uplink scheduling grant signaling (for example, UL grant) sent by an LTE eNB, the UE sends uplink data in a $k'^{th}$ subframe, where a time interval between the $k'^{th}$ subframe and the $k^{th}$ subframe is four subframes in an FDD system, and greater than or equal to four subframes in a TDD system. That is, in the FDD system, assuming that the LTE UE receives the UL grant in a first subframe in a radio frame, the UE sends the uplink data in a fifth subframe in the radio frame, and the foregoing specific time in this example is the fifth subframe.

To ensure that the communications device (for example, a WiFi device) supporting the CCA performed on the broadband may also determine that the band resource of the unlicensed spectrum is used, the LTE UE may further send, on other band resources except the band resource 1, that is, a band resource 2 to a band resource 5, a signal indicating a band resource that can be used by the LTE UE in the unlicensed spectrum. This is equivalent to that the LTE UE sends the signal on all band resources of the unlicensed spectrum, so that the communications device supporting the CCA performed on the broadband detects, by means of energy detection, that energy of a the whole band resource is relatively high. Compared with a method in which the LTE UE sends, only on the band resource 1, the signal indicating that the LTE UE uses the unlicensed spectrum, a probability that the communications device supporting the CCA performed on the broadband considers, by mistake, that the unlicensed spectrum is in an idle state may be reduced. However, in addition, to avoid false determining on usage of the unlicensed spectrum by another communications device (for example, an LTE device) supporting CCA performed on a partial band resource, the signal that is sent by the LTE UE on the band resource 2 to the band resource 5 and that indicates the band resource that can be used by the LTE UE in the unlicensed spectrum includes information indicating that the LTE UE uses the band resource 1.

Preferably, mutual orthogonality between multiple band resources of the unlicensed spectrum is implemented by using FDM, and one orthogonal code is allocated to each band resource, where orthogonal codes on different band resources are orthogonal to each other or have relatively low correlation. Therefore, the signal that is sent by the communications device on another band resource in the unlicensed spectrum except the preset band resource and that indicates the band resource that can be used by the communications device in the unlicensed spectrum includes an orthogonal code of the band resource that can be used by the communications device, or the sent signal indicating the band resource that can be used by the communications device in the unlicensed spectrum is a signal on which modulation and/or encoding processing is performed by using the orthogonal code of the band resource that can be used by the communications device in the unlicensed spectrum as a scrambling code.

In this embodiment of the present invention, a time location in which the signal indicating the band resource that can be used by the communications device in the unlicensed spectrum is sent may be the same as a time location in which the signal indicating that the communications device uses the unlicensed spectrum is sent, and a frequency location in which the signal indicating the band resource that can be used by the communications device in the unlicensed spectrum is sent may be another band resource in the unlicensed spectrum except the preset band resource. When the signal indicating that the communications device uses the unlicensed spectrum also includes identification information of the band resource that can be used by the communications device in the unlicensed spectrum, it indicates that the signal indicating that the communications device uses the unlicensed spectrum may be the same as the signal indicating the band resource that can be used by the communications device in the unlicensed spectrum. The signal indicating that the communications device uses the unlicensed spectrum may also be considered as a first channel, and the signal indicating the band resource that can be used by the communications device in the unlicensed spectrum may be considered as a second channel. Further, if another communications device also sends service data, such as a PDSCH or a PUSCH, on the band resource on which the communications device sends the signal indicating the band resource that can be used by the communications device in the unlicensed spectrum, the service data sent by the another communications device may also include identification information of the band resource on which the another communications device sends the service data. In this way, by combining a scheduling constraint, if the band resource that can be used by the communications device that sends the signal indicating the band resource that can be used by the communications device in the unlicensed spectrum and a band resource that can be used by the another communications device that sends the service data are staggered by using the FDM, even if the communications device sends the signal indicating the band resource that can be used by the communications device in the unlicensed spectrum, the another communications device that sends the service data is not interfered on the band resource.

In this embodiment of the present invention, another manner of sending the signal indicating the band resource that can be used by the communications device in the unlicensed spectrum may further be sending, only on some REs, the signal indicating the band resource that can be used by the communications device in the unlicensed spectrum, and correspondingly, different band resources may occupy REs of different time-frequency resources. When sending data by using a band resource on the unlicensed band resource, the communications device may perform muting on a time-frequency resource location corresponding to the signal indicating the band resource that can be used by the communications device in the unlicensed spectrum, that is, sending no service data, so as to prevent the sent signal indicating the band resource that can be used by the communications device in the unlicensed spectrum from interfering with the sent service data.

In this embodiment of the present invention, a time resource and/or a frequency domain resource used for sending the signal indicating the band resource that can be used by the communications device in the unlicensed spectrum may be notified to the communications device by using physical layer signaling or RRC signaling, or may be implemented by stipulation in a standard protocol, or may be implemented by factory setting, or may be implemented by centralized configuration on a network side. Likewise, orthogonal codes corresponding to different band resources may also be notified to the communications device by using the physical layer signaling or the RRC signaling, or may be implemented by stipulation in the standard protocol, or may be implemented by factory setting, or may be implemented by centralized configuration on the network side.

In this embodiment of the present invention, the clear channel assessment CCA performed to determine whether the band resource that can be used by the communications device in the unlicensed spectrum is idle is implemented by means of energy detection and/or signal parsing. An example in which the preset band resource is a band resource that is in the unlicensed spectrum and that is corresponding to the band resource that can be used by the communications device is used for description. Specifically, the energy detection means that the communications device may receive, in a start time and an end time of CCA, a signal on the band resource that is in the unlicensed spectrum and that is corresponding to the band resource that can be used by the communications device, and calculate energy of the received signal. If the energy of the received signal is lower than a set threshold, it may be considered that the band resource that is in the unlicensed spectrum and that is corresponding to the band resource that can be used by the communications device can be used (that is, idle). The signal parsing means that the communications device may receive, in the start time and the end time of the CCA, the signal on the band resource that is in the unlicensed spectrum and that is corresponding to the band resource that can be used by the communications device, and demodulate the signal. If it may be deduced, by using information obtained by demodulation, that the band resource that is in the unlicensed spectrum and that is corresponding to the band resource that can be used by the communications device can be used and a time range in which the band resource can be used, it may be determined that the band resource that is in the unlicensed spectrum and that is corresponding to the band resource that can be used by the communications device can be used and the time range in which the band resource can be used. A combination of the foregoing two methods may also be used for the communications device to determine whether the band resource that is in the unlicensed spectrum and that is corresponding to the band resource that can be used by the communications device can be used. That is, when a result of the energy detection is lower than a threshold, and it may be deduced, by using the information obtained by demodulation, that the band resource that is in the unlicensed spectrum and that is corresponding to the band resource that can be used by the communications device can be used, it may be considered that the band resource that is in the unlicensed spectrum and that is corresponding to the band resource that can be used by the communications device can be used. It should be noted that the band resource that is in the unlicensed spectrum and that is corresponding to the band resource that can be used by the communications device is described above, and details are not described herein.

Based on any one of the foregoing embodiments, in S41, determining, by the communications device, whether the unlicensed spectrum is in an idle state includes the following three manners.

Manner A: Whether the unlicensed spectrum is in an idle state is determined by detecting a signal indicating that another communications device uses the unlicensed spectrum, which is specifically:

when performing the CCA, if the communications device detects, on the preset band resource in the unlicensed spectrum, the signal that is sent by the another communications device and that indicates that the another communications device uses the unlicensed spectrum, the communications device determines that the unlicensed spectrum is in a non-idle state; or when performing the CCA, if the communications device does not detect, on the preset band resource in the unlicensed spectrum, the signal that is sent by the another communications device and that indicates that the another communications device uses the unlicensed spectrum, the communications device determines that the unlicensed spectrum is in an idle state.

Manner B: Whether the unlicensed spectrum is in an idle state is determined by detecting a signal indicating a band resource that can be used by another communications device in the unlicensed spectrum, which is specifically:

when performing the CCA, if the communications device detects, on the preset band resource in the unlicensed spectrum, the signal that is sent by the another communications device and that indicates the band resource that can be used by the another communications device in the unlicensed spectrum, the communications device determines whether the unlicensed spectrum is in an idle state according to whether the band resource that can be used by the another communications device and the band resource that can be used by the communications device are a same band resource.

In this manner, determining, by the communications device, whether the unlicensed spectrum is in an idle state according to whether the band resource that can be used by the another communications device and the band resource that can be used by the communications device are a same band resource includes:

if the communications device determines that the band resource that can be used by the another communications device and the band resource that can be used by the communications device are the same band resource, determining, by the communications device, that the unlicensed spectrum is in a non-idle state; or if the communications device determines that the band resource that can be used by the another communications device and the band resource that can be used by the communications device are not the same band resource, determining, by the communications device, that the unlicensed spectrum is in an idle state.

In this manner, if the signal indicating the band resource that can be used by the another communications device in the unlicensed spectrum includes identification information of the band resource that is in the unlicensed spectrum and that can be used by the another communications device, when determining that the band resource that can be used by another communications device and the band resource that can be used by the communications device are not the same band resource, the communications device obtains the identification information of the band resource that can be used by the another communications device from the detected signal indicating the band resource that can be used by the another communications device in the unlicensed spectrum, and determines, according to whether the identification information of the band resource that can be used by the communications device and the identification information of the band resource that can be used by another communications device are the same, whether the band resource that can be used by the another communications device and the band resource that can be used by the communications device are the same band resource. Specifically, if the identification information of the band resource that can be used by the communications device and the identification information of the band resource that can be used by the another communications device are the same, the band resource that can be used by the another communications device and the band resource that can be used by the communications device are the same band resource; or if the identification information of the band resource that can be used by the communications device and the identification information of the band resource that can be used by the another communications device are not the same, the band resource that can be used by the another communications device and the band resource that can be used by the communications device are not the same band resource.

In this manner, if the signal indicating the band resource that can be used by the another communications device in the unlicensed spectrum is a signal on which modulation and/or encoding processing is performed by using the identification information of the band resource that is in the unlicensed spectrum and that can be used by the another communications device as a scrambling code, when determining that the band resource that can be used by the another communications device and the band resource that can be used by the communications device are not the same band resource, the communications device uses the identification information of the band resource that can be used by the communications device as a scrambling code to perform demodulation and/or decoding processing on the detected signal indicating the band resource that can be used by the another communications device in the unlicensed spectrum, and determines, according to whether the signal indicating the band resource that can be used by the another communications device in the unlicensed spectrum can be properly demodulated and/or decoded, whether the band resource that can be used by the another communications device and the band resource that can be used by the communications device are the same band resource. Specifically, if the signal indicating the band resource that can be used by the another communications device in the unlicensed spectrum can be properly demodulated and/or decoded, the band resource that can be used by the another communications device and the band resource that can be used by the communications device are the same band resource; or if the signal indicating the band resource that can be used by the another communications device in the unlicensed spectrum cannot be properly demodulated and/or decoded, the band resource that can be used by the another communications device and the band resource that can be used by the communications device are not the same band resource.

Preferably, this manner applies to the scenario in which the preset band resource is the band resource that is in the unlicensed spectrum and that is corresponding to the band resource that can be used by the communications device, and the communications device performs the CCA on the preset band resource.

In this manner, an example in which the signal indicating the band resource that can be used by the another communications device in the unlicensed spectrum includes an orthogonal code is used. Different band resources in the unlicensed spectrum are corresponding to different orthogonal codes, and the communications device supports centralized scheduling, and therefore, different communications devices (for example, LTE UE) may be scheduled on different band resources based on a scheduling constraint. In this case, signals that are sent by different communications devices and that indicate the band resource that can be used by the another communications device in the unlicensed spectrum include different orthogonal codes that are corresponding to different band resources. For example, it is assumed that the unlicensed spectrum resource includes a band resource 1 to a band resource 5, and corresponding orthogonal codes are C1 to C5, where the C1 to the C5 are pairwise orthogonal to each other or have a low correlation feature. In an example in which the communications device is LTE UE, it is further assumed that LTE UE 1 is scheduled on the band resources 1 to 3, and LTE UE 2 is scheduled on the band resources 4 to 5. Assuming that a CCA process of the LTE UE 1 ends first, according to the present invention, after the LTE UE 1 determines, by means of CCA, that the scheduled band resources 1 to 3 in the unlicensed spectrum can be used, and before arrival of a next subframe boundary for sending data by the LTE UE 1, a signal indicating that the LTE UE 1 uses the unlicensed spectrum is sent on the band resources 1 to 3, and at the same time, a signal indicating a band resource that can be used by the LTE UE 1 in the unlicensed spectrum is sent on each band resource in the band resources 4 to 5, where the signal indicating the band resource that can be used by the LTE UE 1 in the unlicensed spectrum includes the C1 to the C3. In this case, even if a CCA process of the LTE UE 2 ends later, the LTE UE 2 performs CCA only on the band resources 4 to 5, and performs, according to the band resources on which the LTE UE 2 is scheduled and by using the orthogonal codes C4 to C5, related detection respectively on the signals that are received on the band resources 4 to 5 and that indicate the band resource that can be used by the LTE UE 1 in the unlicensed spectrum, and the orthogonal codes C1 to C5 are pairwise orthogonal to each other, and therefore, energy of the related detection is extremely low or is zero. In this case, the LTE UE 2 may determine that the band resources 4 to 5 on which the LTE UE 2 is scheduled are not used by another LTE UE, and therefore may determine that a band resource that is in the unlicensed spectrum and that is corresponding to the band resources on which the LTE UE 2 is scheduled is in an idle state.

It should be noted that, it can be seen from FIG. 6A that when performing the CCA, the LTE UE 2 can detect only a part of the signal that is sent by the LTE UE 1 and that indicates the band resource that can be used by the LTE UE 1 in the unlicensed spectrum. Therefore, to ensure correlation between different orthogonal codes corresponding to different band resources, a constitution manner of repetition of short orthogonal codes is used for different orthogonal codes corresponding to different band resources, that is, orthogonal codes of different signals that include different orthogonal codes and that indicate band resources that can be used by different communications devices in the unlicensed spectrum are times of a positive integer lengths of short orthogonal codes, and truncated orthogonal codes maintain orthogonal to each other.

Manner C: The communications device determines whether the unlicensed spectrum is in an idle state by detecting the signal indicating that the another communications device uses the unlicensed spectrum and the signal indicating the band resource that can be used by the another communications device in the unlicensed spectrum, which is specifically:

when performing the CCA, if the communications device detects, on the preset band resource in the unlicensed spectrum, the signal that is sent by the another communications device and that indicates that the another communications device uses the unlicensed spectrum, the communications device determines that the unlicensed spectrum is in a non-idle state; or when performing the CCA, if the communications device does not detect, on the preset band resource in the unlicensed spectrum, the signal that is sent by the another communications device and that indicates that the another communications device uses the unlicensed spectrum, but detects, on the preset band resource in the unlicensed spectrum, the signal that is sent by the another communications device and that indicates the band resource that can be used by the another communications device in the unlicensed spectrum, the communications device determines whether the unlicensed spectrum is in an idle state according to whether the band resource that can be used by the another communications device and the band resource that can be used by the communications device are the same band resource.

In this manner, determining, by the communications device, whether the unlicensed spectrum is in an idle state according to whether the band resource that can be used by the another communications device and the band resource that can be used by the communications device are a same band resource includes:

if the communications device determines that the band resource that can be used by the another communications device and the band resource that can be used by the communications device are the same band resource, determining, by the communications device, that the unlicensed spectrum is in a non-idle state; or if the communications device determines that the band resource that can be used by the another communications device and the band resource that can be used by the communications device are not the same band resource, determining, by the communications device, that the unlicensed spectrum is in an idle state.

Preferably, this manner applies to the scenario in which the preset band resource is the band resource that is in the unlicensed spectrum and that is corresponding to the band resource that can be used by the communications device, and the communications device performs the CCA on the preset band resource.

Based on any one of the foregoing embodiments, the communications device may further determine, according to pre-collected information, whether to use the solutions provided in the present invention. For example, a communications device (for example, an LTE base station) may first determine UEs that can monitor each other and UEs that cannot monitor each other in LTE UEs served by the communications device, and then determines, during scheduling, whether the foregoing three scenarios in which the unlicensed spectrum cannot be effectively used occur. If the scenarios occur, LTE UE may perform CCA and send padding (including a signal indicating that another communications device uses the unlicensed spectrum and/or a signal indicating a band resource that can be used by the another communications device in the unlicensed spectrum) according to the solutions provided in the present invention, or if the scenarios do not occur, the solutions provided in the present invention may be used, or the solutions provided in the present invention may not be used, which is not limited herein.

Figure 8:
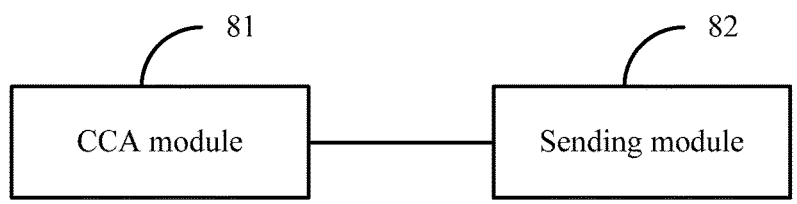
FIG. 8 is a schematic diagram of a first communications device according to an embodiment of the present invention.

Based on a same inventive concept, an embodiment of the present invention provides a communications device. As shown in FIG. 8, the communications device includes:

a CCA module 81, configured to perform clear channel assessment CCA on an unlicensed spectrum; and a sending module 82, configured to: when the CCA module 81 determines that the unlicensed spectrum is in an idle state, send, on a preset band resource in the unlicensed spectrum, a signal indicating that the communications device uses the unlicensed spectrum, where the preset band resource is a partial band resource in the unlicensed spectrum.

In this embodiment of the present invention, the communications device performs the CCA on the unlicensed spectrum; and when determining that the unlicensed spectrum is in an idle state, the communications device sends, on the preset band resource in the unlicensed spectrum, the signal indicating that the communications device uses the unlicensed spectrum. Because, the communications device sends, only on the preset band resource in the unlicensed spectrum, the signal indicating that the communications device uses the unlicensed spectrum, and the preset band resource is a partial band resource in the unlicensed spectrum, data transmission of another communications device and/or determining of whether the unlicensed spectrum is idle by means of CCA detection by the another communications device is not affected, mutual interference between communications devices when the unlicensed spectrum is used is eliminated, and utilization of the unlicensed spectrum is further improved.

Preferably, the preset band resource is:

a band resource in the unlicensed spectrum, where the band resource and a band resource that can be used by the communications device have a same frequency-domain location but different time-domain locations (for details, refer to the foregoing manner b, and details are not described herein again); or a band resource that is in the unlicensed spectrum and that is specified to be used only to send the signal indicating that the communications device uses the unlicensed spectrum (for details, refer to the foregoing manner a, and details are not described herein again).

Based on any one of the foregoing embodiments, the CCA module 81 is specifically configured to:

perform the CCA on the preset band resource in the unlicensed spectrum (for details, refer to the foregoing manner 1, and details are not described herein again).

It should be noted that the CCA module 81 may further perform CCA on a the whole band resource in the unlicensed spectrum. For details, refer to the foregoing manner 2, and details are not described herein again.

Based on any one of the foregoing embodiments, if the preset band resource is a band resource that is in the unlicensed spectrum and that is corresponding to the band resource that can be used by the communications device, after determining, by the CCA module 81, that the unlicensed spectrum is in an idle state, the sending module 82 is further configured to:

send, on another band resource in the unlicensed spectrum except the preset band resource, the signal indicating the band resource that can be used by the communications device in the unlicensed spectrum.

Preferably, the signal indicating the band resource that can be used by the communications device in the unlicensed spectrum includes identification information of the band resource that can be used by the communications device in the unlicensed spectrum (for details, refer to the foregoing manner 1, and details are not described herein again); or the signal indicating the band resource that can be used by the communications device in the unlicensed spectrum is a signal on which modulation and/or encoding processing is performed by using identification information of the band resource that can be used by the communications device in the unlicensed spectrum as a scrambling code (for details, refer to the foregoing manner 2, and details are not described herein again).

Based on any one of the foregoing embodiments, determining, by the CCA module 81, whether the unlicensed spectrum is in an idle state includes:

when performing the CCA, if a signal that is sent by another communications device and that indicates that the another communications device uses the unlicensed spectrum is detected on the preset band resource in the unlicensed spectrum, determining that the unlicensed spectrum is in a non-idle state; or when performing the CCA, if a signal that is sent by another communications device and that indicates that the another communications device uses the unlicensed spectrum is not detected on the preset band resource in the unlicensed spectrum, determining that the unlicensed spectrum is in an idle state.

For details about the foregoing determining whether the unlicensed spectrum is in an idle state, refer to the foregoing manner A, and details are not described herein again.

Based on any one of the foregoing embodiments, the determining, by the CCA module 81, whether the unlicensed spectrum is in an idle state includes:

when performing the CCA, if a signal that is sent by the another communications device and that indicates a band resource that can be used by the another communications device in the unlicensed spectrum is detected on the preset band resource in the unlicensed spectrum, determining whether the unlicensed spectrum is in an idle state according to whether the band resource that can be used by the another communications device and the band resource that can be used by the communications device are a same band resource.

Further, the determining, by the CCA module 81, whether the unlicensed spectrum is in an idle state according to whether the band resource that can be used by the another communications device and the band resource that can be used by the communications device are a same band resource includes:

if the band resource that can be used by the another communications device and the band resource that can be used by the communications device are the same band resource, determining that the unlicensed spectrum is in a non-idle state; or if the band resource that can be used by the another communications device and the band resource that can be used by the communications device are not the same band resource, determining that the unlicensed spectrum is in an idle state.

For details about the foregoing determining whether the unlicensed spectrum is in an idle state, refer to the foregoing manner B and manner C, and details are not described herein again.

Figure 9:
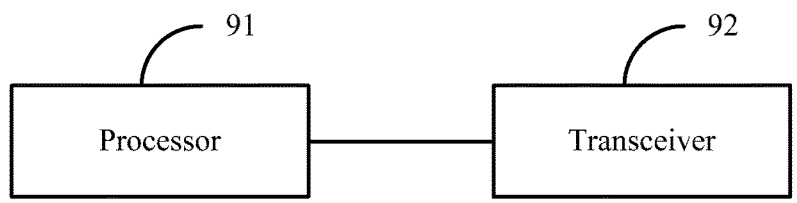
FIG. 9 is a schematic diagram of a second communications device according to an embodiment of the present invention.

Based on a same inventive concept, an embodiment of the present invention provides another communications device. As shown in FIG. 9, the communications device includes:

a processor 91, configured to perform clear channel assessment CCA on an unlicensed spectrum; and a transceiver 92, configured to: when the processor 91 determines that the unlicensed spectrum is in an idle state, send, on a preset band resource in the unlicensed spectrum, a signal indicating that the communications device uses the unlicensed spectrum, where the preset band resource is a partial band resource in the unlicensed spectrum.

The processor 91 is connected to the transceiver 92 by using a bus.

In this embodiment of the present invention, the communications device performs the CCA on the unlicensed spectrum; and when determining that the unlicensed spectrum is in an idle state, the communications device sends, on the preset band resource in the unlicensed spectrum, the signal indicating that the communications device uses the unlicensed spectrum. Because the communications device sends, only on the preset band resource in the unlicensed spectrum, the signal indicating that the communications device uses the unlicensed spectrum, and the preset band resource is a partial band resource in the unlicensed spectrum, data transmission of another communications device and/or determining of whether the unlicensed spectrum is idle by means of CCA detection by the another communications device is not affected, mutual interference between communications devices when the unlicensed spectrum is used is eliminated, and utilization of the unlicensed spectrum is further improved.

Preferably, the preset band resource is:

a band resource in the unlicensed spectrum, where the band resource and a band resource that can be used by the communications device have a same frequency-domain location but different time-domain locations (for details, refer to the foregoing manner b, and details are not described herein again); or a band resource that is in the unlicensed spectrum and that is specified to be used only to send the signal indicating that the communications device uses the unlicensed spectrum (for details, refer to the foregoing manner a, and details are not described herein again).

Based on any one of the foregoing embodiments, the processor 91 is specifically configured to:

perform the CCA on the preset band resource in the unlicensed spectrum (for details, refer to the foregoing manner 1, and details are not described herein again).

It should be noted that the processor 91 may further perform CCA on a the whole band resource in the unlicensed spectrum. For details, refer to the foregoing manner 2, and details are not described herein again.

Based on any one of the foregoing embodiments, after determining, by the processor 91, that the unlicensed spectrum is in an idle state, the transceiver 92 is further configured to:

send, on another band resource in the unlicensed spectrum except the preset band resource, the signal indicating the band resource that can be used by the communications device in the unlicensed spectrum.

Preferably, the signal indicating the band resource that can be used by the communications device in the unlicensed spectrum includes identification information of the band resource that can be used by the communications device in the unlicensed spectrum (for details, refer to the foregoing manner 1, and details are not described herein again); or the signal indicating the band resource that can be used by the communications device in the unlicensed spectrum is a signal on which modulation and/or encoding processing is performed by using identification information of the band resource that can be used by the communications device in the unlicensed spectrum as a scrambling code (for details, refer to the foregoing manner 2, and details are not described herein again).

Based on any one of the foregoing embodiments, determining, by the processor 91, whether the unlicensed spectrum is in an idle state includes:

when performing the CCA, if by the transceiver 92 detects, on the preset band resource in the unlicensed spectrum, a signal that is sent by another communications device and that indicates that the another communications device uses the unlicensed spectrum, determining that the unlicensed spectrum is in a non-idle state; or when performing the CCA, if by the transceiver 92 detects, on the preset band resource in the unlicensed spectrum, a signal that is sent by another communications device and that indicates that the another communications device uses the unlicensed spectrum, determining that the unlicensed spectrum is in an idle state.

For details about the foregoing determining whether the unlicensed spectrum is in an idle state, refer to the foregoing manner A, and details are not described herein again.

Based on any one of the foregoing embodiments, the determining, by the processor 91, whether the unlicensed spectrum is in an idle state includes:

when performing the CCA, if the transceiver 92 detects, on the preset band resource in the unlicensed spectrum, a signal that is sent by the another communications device and that indicates a band resource that can be used by the another communications device in the unlicensed spectrum, determining whether the unlicensed spectrum is in an idle state according to whether the band resource that can be used by the another communications device and the band resource that can be used by the communications device are a same band resource.

Further, the determining, by the processor 91, whether the unlicensed spectrum is in an idle state according to whether the band resource that can be used by the another communications device and the band resource that can be used by the communications device are a same band resource includes:

if the band resource that can be used by the another communications device and the band resource that can be used by the communications device are the same band resource, determining that the unlicensed spectrum is in a non-idle state; or if the band resource that can be used by the another communications device and the band resource that can be used by the communications device are not the same band resource, determining that the unlicensed spectrum is in an idle state.

For details about the foregoing determining whether the unlicensed spectrum is in an idle state, refer to the foregoing manner B and manner C, and details are not described herein again.

Persons skilled in the art should understand that the embodiments of the present invention may be provided as a method, a system, or a computer program product. Therefore, the present invention may use a form of hardware only embodiments, software only embodiments, or embodiments with a combination of software and hardware. Moreover, the present invention may use a form of a computer program product that is implemented on one or more computer-usable storage media (including but not limited to a disk memory, a CD-ROM, an optical memory, and the like) that include computer-usable program code.

The present invention is described with reference to the flowcharts and/or block diagrams of the method, the device (system), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may also be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some embodiments of the present invention have been described, persons skilled in the art can make changes and modifications to these embodiments once they learn the basic inventive concept. Therefore, the following claims are intended to be construed as to cover the exemplary embodiments and all changes and modifications falling within the scope of the present invention.

Obviously, persons skilled in the art can make various modifications and variations to the present invention without departing from the scope of the present invention. The present invention is intended to cover these modifications and variations provided that they fall within the scope of protection defined by the following claims and their equivalent technologies.

What is claimed is:

1. A communications device which is a user equipment device (UE) or a base station, wherein the communications device comprises:
    a processor configured to perform clear channel assessment (CCA) on an unlicensed spectrum; and
    a transceiver configured to: when the communication device determines that the unlicensed spectrum is in an idle state, send, on a preset band resource in the unlicensed spectrum, a signal indicating that the communications device uses the unlicensed spectrum, wherein the preset band resource is a partial band resource in the unlicensed spectrum;
    wherein the processor is configured to determine, when performing the CCA, if a signal that is sent by another communications device and that indicates that the another communications device uses the unlicensed spectrum is detected on the preset band resource in the unlicensed spectrum, that the unlicensed spectrum is in a non-idle state; or
    the processor is configured to determine, when performing the CCA, if a signal that is sent by another communications device and that indicates that the another communications device uses the unlicensed spectrum is not detected on the preset band resource in the unlicensed spectrum, that the unlicensed spectrum is in an idle state.

2. The communications device according to claim 1, wherein the preset band resource comprises:
    a band resource in the unlicensed spectrum, wherein the band resource and a band resource that can be used by the communications device have a same frequency-domain location but different time-domain locations; or
    a band resource that is in the unlicensed spectrum and that is specified to be used only to send the signal indicating that the communications device uses the unlicensed spectrum.

3. The communications device according to claim 1, wherein the processor is configured to:
    perform the CCA on the preset band resource in the unlicensed spectrum.

4. The communications device according to claim 1, wherein the transceiver is further configured to:
    send, on another band resource in the unlicensed spectrum except the preset band resource, a signal indicating the band resource that can be used by the communications device in the unlicensed spectrum.

5. The communications device according to claim 4, wherein the signal indicating the band resource that can be used by the communications device in the unlicensed spectrum comprises identification information of the band resource that can be used by the communications device in the unlicensed spectrum; or
    the signal indicating the band resource that can be used by the communications device in the unlicensed spectrum is a signal on which modulation and/or encoding processing is performed by using identification information of the band resource that can be used by the communications device in the unlicensed spectrum as a scrambling code.

6. The communications device according to claim 1, wherein
    the processor is configured to determine, when performing the CCA, if a signal that is sent by the another communications device and that indicates a band resource that can be used by the another communications device in the unlicensed spectrum is detected on the preset band resource in the unlicensed spectrum, whether the unlicensed spectrum is in an idle state according to whether the band resource that can be used by the another communications device and the band resource that can be used by the communications device are a same band resource.

7. The communications device according to claim 6, wherein the processor is configured to determine whether the unlicensed spectrum is in an idle state according to whether the band resource that can be used by the another communications device and the band resource that can be used by the communications device are a same band resource comprises:
    the processor is configured to determine, if the band resource that can be used by the another communications device and the band resource that can be used by the communications device are the same band resource, the unlicensed spectrum is in a non-idle state; or
    the processor configured to determine, if the band resource that can be used by the another communications device and the band resource that can be used by the communications device are not the same band resource, the unlicensed spectrum is in an idle state.

8. A data transmission method comprising:
    performing, by a communications device, clear channel assessment (CCA) on an unlicensed spectrum; and
    when determining that the unlicensed spectrum is in an idle state, sending, by the communications device on a preset band resource in the unlicensed spectrum, a signal indicating that the communications device uses the unlicensed spectrum, wherein the preset band resource is a partial band resource in the unlicensed spectrum;
    wherein determining, by the communications device, whether the unlicensed spectrum is in an idle state comprises:
    when performing the CCA, if the communications device detects, on the preset band resource in the unlicensed spectrum, a signal that is sent by another communications device and that indicates that the another communications device uses the unlicensed spectrum, determining, by the communications device, that the unlicensed spectrum is in a non-idle state, or
    when performing the CCA, if the communications device does not detect, on the preset band resource in the unlicensed spectrum, a signal that is sent by another communications device and that indicates that the another communications device uses the unlicensed spectrum, determining, by the communications device, that the unlicensed spectrum is in an idle state.

9. The method according to claim 8, wherein the preset band resource comprises:
    a band resource in the unlicensed spectrum, wherein the band resource and a band resource that can be used by the communications device have a same frequency-domain location but different time-domain locations; or a band resource that is in the unlicensed spectrum and that is specified to be used only to send the signal indicating that the communications device uses the unlicensed spectrum.

10. The method according to claim 8, wherein the performing, by the communications device, the CCA on an unlicensed spectrum comprises:

performing, by the communications device, the CCA on the preset band resource in the unlicensed spectrum.

11. The method according to claim 8, wherein after determining, by the communications device, that the unlicensed spectrum is in an idle state, the method further comprises:

sending, by the communications device on another band resource in the unlicensed spectrum except the preset band resource, a signal indicating the band resource that can be used by the communications device in the unlicensed spectrum.

12. The method according to claim 11, wherein the signal indicating the band resource that can be used by the communications device in the unlicensed spectrum comprises identification information of the band resource that can be used by the communications device in the unlicensed spectrum; or the signal indicating the band resource that can be used by the communications device in the unlicensed spectrum is a signal on which modulation and/or encoding processing is performed by using identification information of the band resource that can be used by the communications device in the unlicensed spectrum as a scrambling code.

13. The method according to claim 8, wherein the determining, by the communications device, whether the unlicensed spectrum is in an idle state comprises:

when performing the CCA, if the communications device detects, on the preset band resource in the unlicensed spectrum, a signal that is sent by the another communications device and that indicates a band resource that can be used by the another communications device in the unlicensed spectrum, determining, by the communications device, whether the unlicensed spectrum is in an idle state according to whether the band resource that can be used by the another communications device and the band resource that can be used by the communications device are a same band resource.

14. The method according to claim 13, wherein the determining, by the communications device, whether the unlicensed spectrum is in an idle state according to whether the band resource that can be used by the another communications device and the band resource that can be used by the communications device are a same band resource comprises:

if the communications device determines that the band resource that can be used by the another communications device and the band resource that can be used by the communications device are the same band resource, determining, by the communications device, that the unlicensed spectrum is in a non-idle state; or if the communications device determines that the band resource that can be used by the another communications device and the band resource that can be used by the communications device are not the same band resource, determining, by the communications device, that the unlicensed spectrum is in an idle state.

* * * * *

UNITED STATES PATENT AND TRADEMARK OFFICE
CERTIFICATE OF CORRECTION

PATENT NO. : 10,212,717 B2
APPLICATION NO. : 15/416524
DATED : February 19, 2019
INVENTOR(S) : Juan Zheng et al.

Page 1 of 1

It is certified that error appears in the above-identified patent and that said Letters Patent is hereby corrected as shown below:

In the Claims

Column 34, Line 54, In Claim 8, delete "non-idle state," and insert -- non-idle state; --, therefor.

Signed and Sealed this
Eighth Day of October, 2019

Andrei Iancu
*Director of the United States Patent and Trademark Office*